US009741215B2

(12) United States Patent
Brav et al.

(10) Patent No.: US 9,741,215 B2
(45) Date of Patent: Aug. 22, 2017

(54) WEARABLE HAPTIC FEEDBACK DEVICES AND METHODS OF FABRICATING WEARABLE HAPTIC FEEDBACK DEVICES

(71) Applicant: Elwha LLC, Bellevue, WA (US)

(72) Inventors: Ehren J. Brav, Bainbridge Island, WA (US); G. Scott Bright, Seattle, WA (US); Joshua Buesseler, Seattle, WA (US); Alistair K. Chan, Bainbridge Island, WA (US); William David Duncan, Mill Creek, WA (US); Aren Anders Kaser, Seattle, WA (US); Edward Stephen Lowe, Jr., Seattle, WA (US); Sean Gregory McBeath, Seattle, WA (US); Carole McClellan, Seattle, WA (US); Sean Patrick Murphy, San Francisco, CA (US); Marc Singer, Seattle, WA (US)

(73) Assignee: Elwha LLC

( * ) Notice: Subject to any disclaimer, the term of this patent is extended or adjusted under 35 U.S.C. 154(b) by 0 days.

(21) Appl. No.: 14/965,089

(22) Filed: Dec. 10, 2015

(65) Prior Publication Data

US 2016/0171846 A1 Jun. 16, 2016

Related U.S. Application Data

(63) Continuation-in-part of application No. 14/746,454, filed on Jun. 22, 2015.

(60) Provisional application No. 62/090,751, filed on Dec. 11, 2014.

(51) Int. Cl.

| | |
|---|---|
| *A63F 9/24* | (2006.01) |
| *A63F 13/00* | (2014.01) |
| *G06F 17/00* | (2006.01) |
| *G06F 19/00* | (2011.01) |
| *G08B 6/00* | (2006.01) |

(52) U.S. Cl.
CPC .................................... *G08B 6/00* (2013.01)

(58) Field of Classification Search
USPC ........................ 463/7, 20, 22, 25, 29, 30, 39
See application file for complete search history.

(56) References Cited

U.S. PATENT DOCUMENTS

| | | | |
|---|---|---|---|
| 5,565,840 | A | 10/1996 | Thorner et al. |
| 6,411,276 | B1 | 6/2002 | Braun et al. |
| 6,430,450 | B1 | 8/2002 | Bach-y-Rita et al. |
| 6,714,213 | B1 | 3/2004 | Lithicum et al. |
| 6,831,640 | B2 | 12/2004 | Shih et al. |

(Continued)

OTHER PUBLICATIONS

Berkley, Jeffrey J.; "Haptic Devices"; May 5, 2003; pp. 1-4; Mimic Technologies Inc.

(Continued)

*Primary Examiner* — Adetokunbo O Torimiro

(57) ABSTRACT

Embodiments include wearable haptic feedback devices and methods of fabricating wearable haptic feedback devices. In an illustrative embodiment given by way of non-limiting example, a wearable haptic feedback device includes: a wearable headgear cap; a web disposed within the cap; a plurality of haptic elements disposed about the web and configured to provide haptic feedback to a user; and an interface circuit configured to operatively couple the plurality of haptic elements to an electronic system.

33 Claims, 38 Drawing Sheets

(56) References Cited

U.S. PATENT DOCUMENTS

| | | | |
|---|---|---|---|
| 6,965,312 B2 | 11/2005 | Lerg | |
| 7,132,928 B2 | 11/2006 | Perricone | |
| 7,570,426 B2 | 8/2009 | Rodgers et al. | |
| 7,696,860 B2 | 4/2010 | Gilson et al. | |
| 7,696,919 B2 | 4/2010 | Moraites | |
| 8,308,558 B2 | 11/2012 | Thorner | |
| 8,362,945 B2 | 1/2013 | Nguyen et al. | |
| 9,107,012 B2 | 8/2015 | Lord et al. | |
| 9,146,251 B2 | 9/2015 | Moraites et al. | |
| 9,464,949 B2 | 10/2016 | Mahlen et al. | |
| 2005/0073439 A1 | 4/2005 | Perricone | |
| 2005/0225443 A1 | 10/2005 | Lerg | |
| 2006/0166678 A1* | 7/2006 | Karaoguz ............. | H04M 1/006 455/456.1 |
| 2006/0241718 A1 | 10/2006 | Tyler et al. | |
| 2007/0139167 A1 | 6/2007 | Gilson et al. | |
| 2008/0120029 A1 | 5/2008 | Zelek et al. | |
| 2009/0213114 A1 | 8/2009 | Dobbins et al. | |
| 2009/0319058 A1 | 12/2009 | Rovaglio et al. | |
| 2010/0040238 A1 | 2/2010 | Jang et al. | |
| 2011/0025492 A1 | 2/2011 | Bravo | |
| 2012/0124470 A1 | 5/2012 | West et al. | |
| 2012/0146291 A1 | 6/2012 | Walker | |
| 2012/0200667 A1 | 8/2012 | Gay et al. | |
| 2012/0256779 A1 | 10/2012 | Nguyen et al. | |
| 2013/0021195 A1 | 1/2013 | Gould et al. | |
| 2013/0218456 A1 | 8/2013 | Zelek et al. | |
| 2014/0218184 A1 | 8/2014 | Grant et al. | |
| 2014/0287806 A1* | 9/2014 | Balachandreswaran | A63F 13/00 463/7 |
| 2015/0268475 A1* | 9/2015 | Lee ......................... | G06F 1/163 345/8 |

OTHER PUBLICATIONS

Bernstein et al.; "Sniper bullet detection by millimeter-wave radar"; Proc. SPIE 3577, Sensors, C31, Information and Training Technologies for Law Enforcement, 231; Jan. 7, 1999; pp. 1-3; located at: http://proceedings.spiedigitallibrary.org/proceeding.aspx?articleid=974277.

"Best Practices for Use of Vibration Feedback in Video Console Games"; Immersion Corporation; Bearing a date of 2010, Created on Nov. 5, 2015; Total of 24 pages.

Brown et al.; "Ku-Band Retrodirective Radar for Ballistic Projectile Detection and Tracking"; Radar Conference 2009; May 4-8, 2009; pp. 1-4; IEEE.

Brown, Elayne; "Retrodirective Noise Correlating Radar: Fast Detection of Small Projectiles Plus Imaging of the Scene"; SBIR-STTR: America's Seed Fund; Bearing a date of 2006, Created on Nov. 4, 2015; pp. 1-2; located at: https://www.sbir.gov/sbirsearch/detail/271231.

Buswell et al.; "The Bat Hat: Ultrasonic range-finder with haptic feedback"; Cornell University : Electrical & Computer Engineering—Final Project; Bearing a date of 2013, Created on Nov. 5, 2015; Total of 19 pages.

Cassinelli et al.; "Augmenting spatial awareness with Haptic Radar"; Wearable Computers, 2006 10th IEEE International Symposium; Oct. 11-14, 2006; Total of 4 pages; IEEE.

Eaton, Kit; "Intendix: Computer Thought-Control Fantasy Made Real"; Fast Company; Bearing a date of Mar. 8, 2010; Total of 8 pages.

"Haptic Feedback device for the Visually Impaired [Project HALO]"; Instructables.com; Bearing a date of Dec. 3, 2014, Created on Nov. 5, 2015; 31 Total Pages; located at: www.instructables.com/id/Haptic-F_eedback-device-for-the-Visually-Impaired/.

Harmer et al.; "Radar Identification of Hostile Fire by Means of the Electromagnetic Complex Natural Resonances of Projectiles"; Progress in Electromagnetics Research M; Apr. 21, 2012; pp. 167-178; vol. 24.

Hommes et al.; "A fast tracking 60 GHz Radar using a frequency scanning antenna"; Infrared, Millimeter, and Terahertz waves (IRMMW-THz), 2014 39th International Conference; Sep. 14-19, 2014; pp. 1-2; IEEE.

Li et al; "Real-Time Tracking of Bullet Trajectory Based on Chirp Transform in a Multi-Sensor Multi-Frequency Radar"; Radar Conference, 2010 IEEE; May 10-14, 2010; pp. 1203-1207; IEEE.

"Marvel Heroes"; Marvelheroes.com; Bearing a date of Jul. 2013; Total of 12 pages; located at: http://forums.marvelheroes.com/discussion/2403/spideysenses-that-should-be-in-game-what-do-you-think.

Mateevitsi et al.; "Sensing the environment through SpiderSense"; 4th Augmented Human International Conference (AH'13); Mar. 7-8, 2013; pp. 51-57.

Pinezich et al.; "A Ballistic Projectile Tracking System Using Continuous Wave Doppler Radar"; Created on Nov. 4, 2015; 7 Total pages.

"SPiDR Hostile Fire Radar delivers stealthy, speed-of-light detection of incoming fire"; Syntonics; Bearing a date of 2015, Created on Nov. 4, 2015; p. 1; located at: http://www.syntonicscorp.com/rd-spidr.html.

"Tingling Electronic Spidey Sense Shirt"; Thinkgeek.com; Bearing a date of 2014, Created on Nov. 5, 2015; Total of 4 pages; located at: http://www.thinkgeek.com/product/f0b1/.

Wolf et al.; "Towards Supporting Situational Awareness using Tactile Feedback"; In Proceedings of the IEEE Symposium on 3D User Interfaces; Mar. 29-30, 2014; pp. 131-132.

PCT International Search Report; International App. No. PCT/US2015/064778; Mar. 21, 2016; pp. 1-3.

PCT International Search Report; International App No. PCT/US2016/025587; Sep. 12, 2016; pp. 1-3.

* cited by examiner

WEARABLE HAPTIC FEEDBACK DEVICES AND METHODS OF FABRICATING WEARABLE HAPTIC FEEDBACK DEVICES

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

The present application constitutes a continuation-in-part of U.S. patent application Ser. No. 14/746,454, entitled FEEDBACK FOR ENHANCED SITUATIONAL AWARENESS, naming Ehren J. Bray, Alistair K. Chan, William David Duncan, Russell J. Hannigan, Roderick A. Hyde, Muriel Y. Ishikawa, Eric Johanson, Jordin T. Kare, Tony S. Pan, Michael Allan Schneider, Elizabeth A. Sweeney, Clarence T. Tegreene, Charles Whitmer, Lowell L. Wood Jr. and Victoria Y. H. Wood as inventors, filed 22 Jun. 2015, which is currently co-pending or is an application of which a currently co-pending application is entitled to the benefit of the filing date, and which claims benefit of priority of U.S. Provisional Patent Application No. 62/090,751, entitled HAPTIC FEEDBACK FOR ENHANCED SITUATIONAL AWARENESS, naming Russell J. Hannigan, Roderick A. Hyde, Muriel Y. Ishikawa, Eric Johanson, Jordin T. Kare, Tony S. Pan, Clarence T. Tegreene, Charles Whitmer, Lowell L. Wood Jr. and Victoria Y. H. Wood as inventors, filed 11 Dec. 2014, which was filed within the twelve months preceding the filing date of the present application or is an application of which a currently co-pending priority application is entitled to the benefit of the filing date.

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

BACKGROUND

The present disclosure relates generally to providing haptic feedback to users. Haptic feedback provides users with stimulation in the form of forces, vibrations, or the like.

SUMMARY

Embodiments include wearable haptic feedback devices and methods of fabricating wearable haptic feedback devices.

In an illustrative embodiment given by way of non-limiting example, a wearable haptic feedback device includes: a wearable headgear cap; a web disposed within the cap; a plurality of haptic elements disposed about the web and configured to provide haptic feedback to a user; and an interface circuit configured to operatively couple the plurality of haptic elements to an electronic system.

In another illustrative embodiment given by way of non-limiting example, a wearable haptic feedback device includes: a wearable headgear cap shaped to conform to a user's head, the wearable headgear cap including a size adjustment device; a web disposed within the cap; a plurality of haptic elements disposed about the web and configured to provide haptic feedback to a user; and an interface circuit configured to operatively couple the plurality of haptic elements to an electronic system.

In another illustrative embodiment given by way of non-limiting example, a wearable haptic feedback device includes: a wearable headgear cap shaped to conform to a user's head; a frame disposed within the cap, the frame including a size adjustment device; a plurality of haptic elements disposed about the frame and configured to provide haptic feedback to a user; and an interface circuit configured to operatively couple the plurality of haptic elements to an electronic system.

In another illustrative embodiment given by way of non-limiting example, a wearable haptic feedback device includes: a wearable headgear cap shaped to conform to a user's head; a placement-assist member disposed on an external surface of the wearable headgear cap; a web disposed within the cap; a plurality of haptic elements disposed about the web and configured to provide haptic feedback to a user; and an interface circuit configured to operatively couple the plurality of haptic elements to an electronic system.

In another illustrative embodiment given by way of non-limiting example, a wearable haptic feedback device includes: a wearable headgear cap shaped to conform to a user's head; a web disposed within the cap, the web including a vibration-reducing covering; a plurality of haptic elements disposed about the web and configured to provide haptic feedback to a user; and an interface circuit configured to operatively couple the plurality of haptic elements to an electronic system.

Another embodiment relates to a method of fabricating a wearable haptic feedback device. The method includes: disposing a plurality of haptic elements about a web, the plurality of haptic elements being configured to provide haptic feedback to a user; disposing the web within a wearable headgear cap; and electrically coupling an interface circuit to the plurality of haptic elements, the interface circuit being configured to operatively couple the plurality of haptic elements to an electronic system.

In another illustrative embodiment given by way of non-limiting example, a method of fabricating a wearable haptic feedback device includes: providing a wearable headgear cap, that is shaped to conform to a user's head, with a size adjustment device; disposing a plurality of haptic elements about a web, the plurality of haptic elements being configured to provide haptic feedback to a user; disposing the web within the wearable headgear cap; and electrically coupling an interface circuit to the plurality of haptic elements, the interface circuit being configured to operatively couple the plurality of haptic elements to an electronic system.

In another illustrative embodiment given by way of non-limiting example, a method of fabricating a wearable haptic feedback device includes: disposing a plurality of haptic elements about a frame with a size adjustment device, the plurality of haptic elements being configured to provide haptic feedback to a user; disposing the frame within a wearable headgear cap shaped to conform to a user's head; and electrically coupling an interface circuit to the plurality of haptic elements, the interface circuit being configured to operatively couple the plurality of haptic elements to an electronic system.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
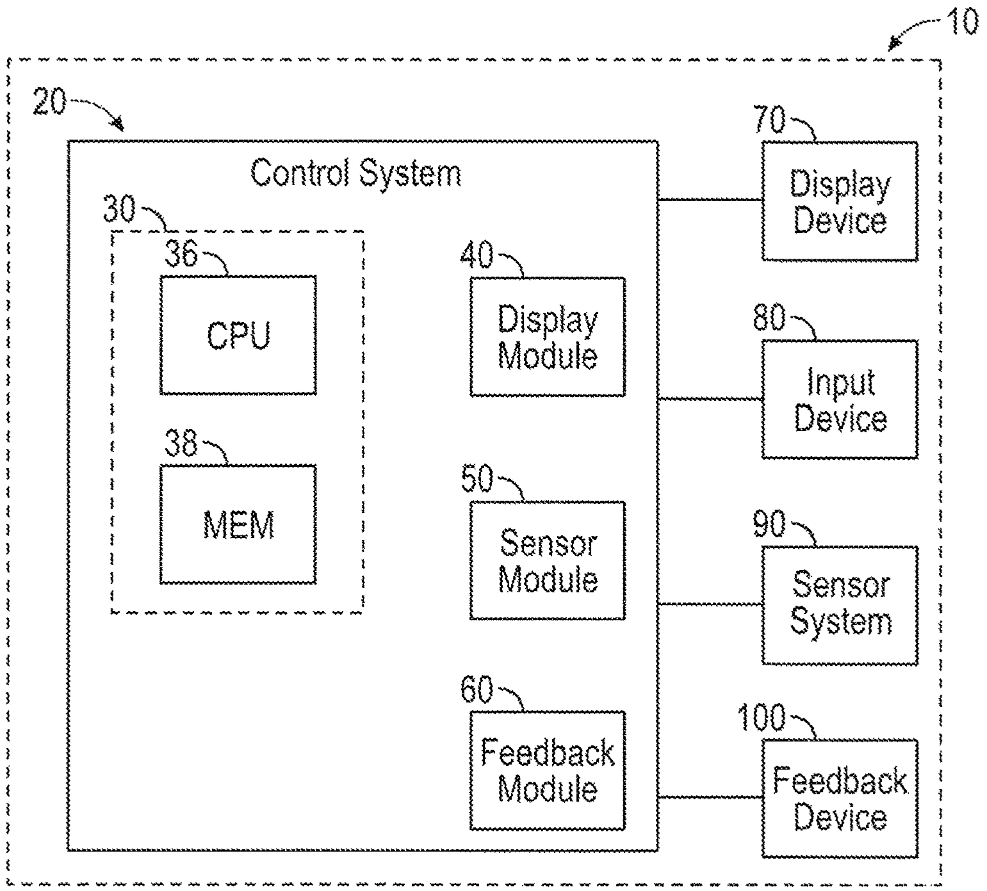
FIG. 1 is a schematic diagram of a feedback system, according to one embodiment.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to the figures generally, various embodiments disclosed herein relate to a feedback system (e.g., a haptic feedback system, an audible/visual feedback system, combinations thereof, etc.) intended to enhance the situational awareness of a user in a given situation (e.g., in a video game, in a real-world application, etc.). When a threat or other object (e.g., opponent, enemy, etc.) is within the proximity of a user (or virtual character) of the feedback system, feedback (e.g., haptic feedback, audible feedback, visual feedback, etc.) is provided to the user to make him/her aware of objects not in his/her field of view or to identify an object in the user's field of view as a threat. Ideally, the feedback becomes second nature to the user of the feedback system such that he/she develops an intuitive sense of the surroundings or a virtual environment. The feedback may be haptic, audible, visual, or combinations thereof, among other possibilities.

For example, video game players are not always aware of objects, other players, and/or threats within a video game, due to limitations of field of vision, distractions, skill, etc. The systems disclosed herein in accordance with various embodiments provide players with feedback regarding a primary object (e.g., a character used by the video game player, a vehicle driven by the video game player, etc.) and a secondary object (e.g., other virtual characters, vehicles, dangers, remote from the primary object, a distal object, etc.). The feedback may be generated based on various data regarding the primary object, secondary objects, a surrounding virtual environment, etc., and may be provided so as to provide an indication of a virtual distance, a virtual direction, an affiliation, a threat level (or nature of the secondary object), a relative velocity, an absolute velocity, a relative acceleration, an absolute acceleration, and the like between the primary object and the secondary object.

Similarly, users may likewise use the systems disclosed herein for real-world applications such as driving, treatment for sight or hearing-impaired persons, aviation, sports, combat, etc. For example, a paintball player may not always recognize/see other players of an opposing team or may have an opposing player sneak up from a side or rearward position. The systems disclosed herein in accordance with various embodiments are configured to provide a user of the feedback system with feedback (e.g., haptic feedback, audible feedback, visual feedback, etc.), thereby increasing the user's awareness of potential threats or other information that may be conveyed through audible, tactile, and/or visual stimulation.

According to the example embodiment shown in FIGS. 1-5C, feedback system 10 (e.g., situational awareness system, etc.) is configured as a video game/electronic game feedback system. In one embodiment, feedback system 10 is configured to provide feedback to a user playing a video game (e.g., a first person shooter game, a racing game, a fighting game, a console game, a computer game, a mobile game, etc.). In other embodiments, feedback system 10 is configured to provide feedback during real-world applications (e.g., driving, sports, etc.). As shown in FIG. 1, feedback system 10 includes control system 20, display device 70, input device 80, sensor system 90, and feedback device 100.

In general terms, control system 20 is configured to provide a display (e.g., a virtual environment, a primary object, distal secondary objects, etc.) to a user playing a video game. Control system 20 receives various types of data regarding users of feedback system 10, a primary object (e.g., a virtual character, a virtual vehicle, etc.), a surrounding environment, a virtual environment, distal secondary objects (e.g., threats, other players, other virtual characters, remote objects, inanimate objects, etc.), etc. Using the data, control system 20 controls the operation of feedback device 100 to provide feedback to a user based on the data. In one embodiment, control system 20 is configured to be used with or installed in a game console. In alternative embodiments, control system 20 may be used with a desktop computer, a laptop, a smartphone, a tablet, virtual reality glasses, or other suitable platform used to operate an electronic game.

As shown in FIG. 1, control system 20 includes processing circuit 30, display module 40, sensor module 50, and feedback module 60. In one embodiment, processing circuit 30 is in data communication with at least one of display module 40, sensor module 50, and feedback module 60 such that data may be transferred between the modules of control system 20 and processing circuit 30.

As shown in FIG. 1, processing circuit 30 includes processor 36 and a memory 38. Processor 36 may be implemented as a general-purpose processor, an application specific integrated circuit (ASIC), one or more field programmable gate arrays (FPGAs), a digital-signal-processor (DSP), a group of processing components, or other suitable electronic processing components. Memory 38 is one or more devices (e.g., RAM, ROM, Flash Memory, hard disk storage, etc.) for storing data and/or computer code for facilitating the various processes described herein. Memory 38 may be or include non-transient volatile memory or non-volatile memory. Memory 38 may include database components, object code components, script components, or any other type of information structure for supporting the various activities and information structures described herein. Memory 38 may be communicably connected to processor 36 and provide computer code or instructions to processor 36 for executing the processes described herein.

Figure 4A:
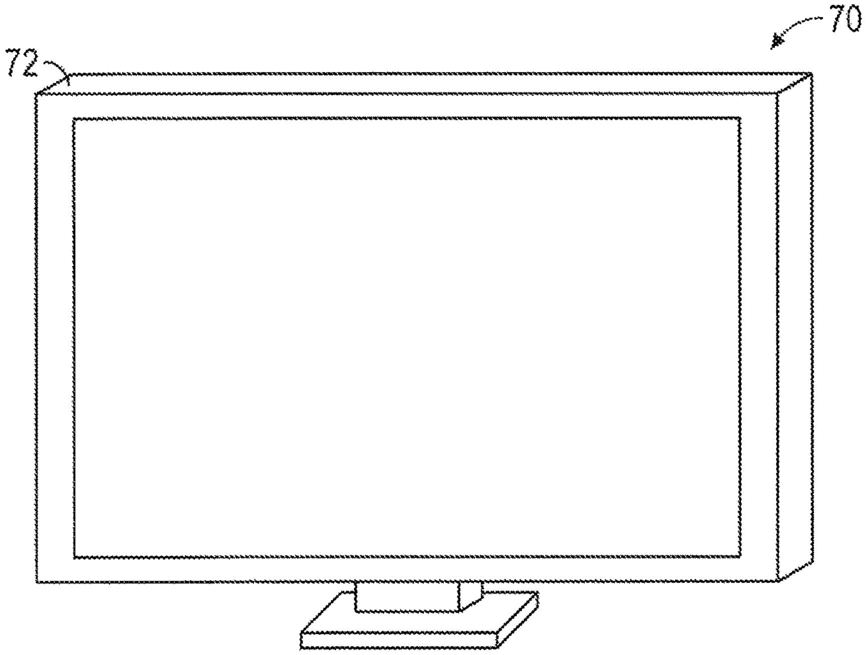
FIG. 4A is an illustration of a stationary display device used with a feedback system, according to one embodiment.
Figure 4B:
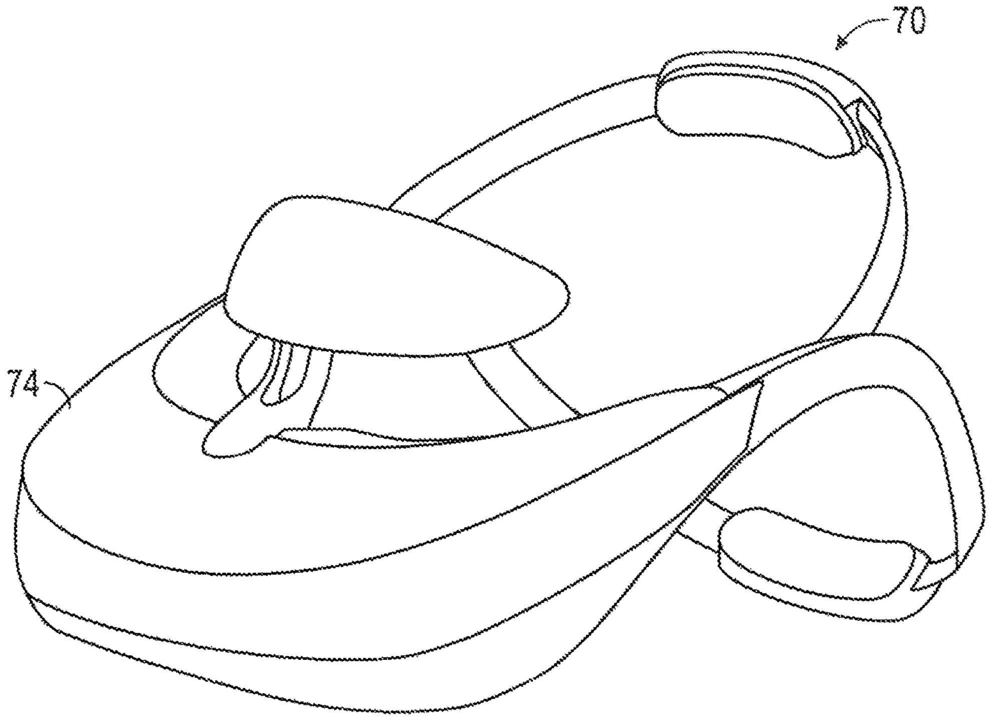
FIG. 4B is an illustration of a wearable display device used with a feedback system, according to one embodiment.

According to an example embodiment, display module 40 is configured to provide a display to display device 70 associated with an electronic game. Display device 70 is configured to provide the display of the video game to a user of feedback system 10. In one embodiment, the display includes a primary object (e.g., a virtual vehicle such as a car, plane, spaceship, boat; a virtual character such as an athlete, a soldier, a ninja; etc.) chosen by the user and a virtual environment (e.g., race track, athletic field, war zone, outer space, etc.) around the primary object. In some embodiments, the display further includes a secondary object (e.g., a virtual character controlled by another user, a virtual character controlled by control system 20, etc.). In some embodiments, the secondary object is an inanimate object within an electronic game (e.g., a ball, a missile, a bullet, a meteor, a boulder, etc.). As shown in FIG. 4A, in one embodiment, display device 70 includes a stationary display device, shown as television 72. By way of example, television 72 may be any type of television, screen, or monitor (e.g., LCD, LED, etc.) configured to provide the display of the video game to a user. As shown in FIG. 4B, in other embodiments, display device 70 includes a wearable display device, shown as virtual reality (VR) glasses 74, configured to be worn over the eyes of a user. In an alternative embodiment, the wearable display device is configured to display an augmented reality (AR) display to a user. In other embodiments, display device 70 includes a portable display device such as, but not limited to, a smartphone, a tablet, a laptop, a portable game console, and the like. In another embodiment, display device 70 includes a projectable display device such as a video projector with a screen, a portable device with projection capabilities, and the like.

Referring back to FIG. 1, sensor module 50 is configured to receive data regarding the primary object and the secondary object of the video game, according to an example embodiment. The data regarding the primary object (e.g., first data, positional data, etc.) may include an indication of a head orientation/direction of travel of the primary object (e.g., a direction in which a virtual character is looking and therefore what the user sees on display device 70, a direction in which a vehicle is traveling, etc.), a location of the primary object in the virtual environment, movement of the primary object (e.g., velocity, acceleration, etc.), an attribute of the primary object (e.g., a weapon, a shield, an offensive capability, a defensive capability, a health, an experience level, a skill level, a strength, a speed, a sensory capability, an agility, etc.), and/or other data regarding the primary object. The data regarding the secondary object (e.g., second data, threat data, etc.) may include an indication of at least one of an affiliation of the secondary object (e.g., opponent, enemy, team member, etc.), a virtual distance to the secondary object (e.g., relative to the location of the primary object, etc.), a threat level/nature of the secondary object (e.g., high threat, low threat, no threat, etc.), an attribute of the secondary object (e.g., a weapon, a shield, an offensive capability, a defensive capability, a health, an experience level, a skill level, a strength, a speed, a sensory capability, an agility, etc.), a location of the secondary object in the virtual environment, a direction between the primary object and the secondary object, an orientation of the secondary object, movement of the secondary object, a velocity of the secondary object (e.g., relative velocity, absolute velocity, etc.), an acceleration of the secondary object (e.g., relative acceleration, absolute acceleration, etc.), and/or still other indications.

In one embodiment, sensor module 50 is further configured to receive event data regarding the electronic game. The event data may include data regarding a setting and/or a condition within the electronic game, such as a change in the level within the game, a change in a situation within the game, performance of the user in the game, an attribute of the primary object, an attribute of the secondary object, a current virtual environment of the game, performance of other users in the game, a difficulty setting of the game, and/or other data.

In some embodiments, sensor system 90 is configured to acquire and provide user data regarding the user of the primary object to sensor module 50. Sensor system 90 may communicate with sensor module 50 in a variety of ways, using any suitable wired and/or wireless communications protocols. According to an example embodiment, sensor system 90 includes a sensor, such as a camera, motion sensor, and/or another device, configured to acquire the user data. In one embodiment, sensor system 90 includes an external sensor system (e.g., located remote from the user, etc.). In other embodiments, sensor system 90 includes a wearable sensor system. The user data may include data regarding an orientation and a movement of at least one of a head, a torso, an arm, and a leg of the user. In one embodiment, the first data of the primary object is based on the user data. For example, the orientation and the movement of the user may be used to control the orientation and movement of a virtual character in a virtual environment.

Figure 5A:
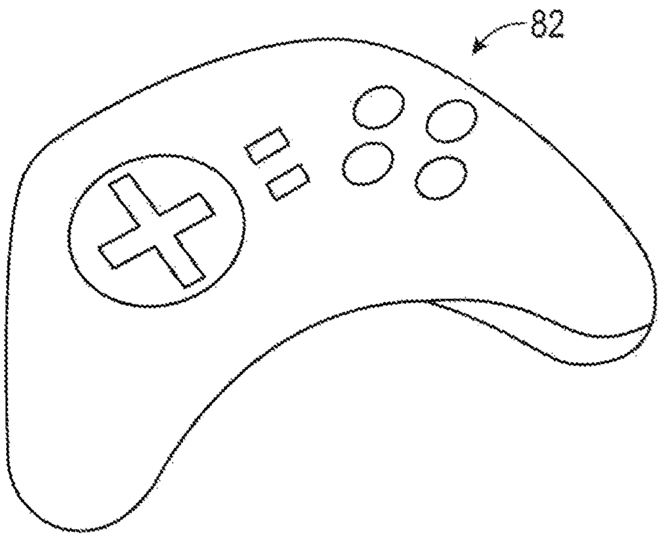
FIG. 5A is an illustration of a hand-held input device used with a feedback system, according to one embodiment.
Figure 5B:
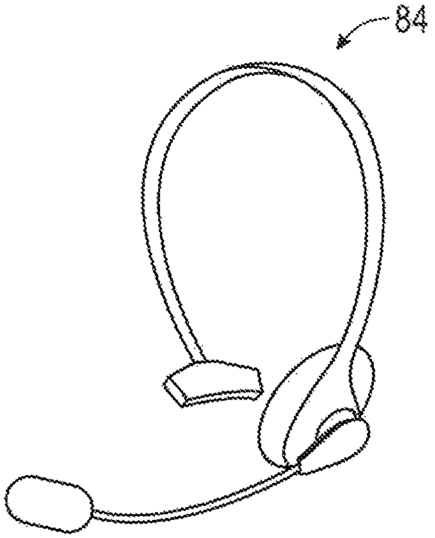
FIG. 5B is an illustration of a voice recognition device used with a feedback system, according to one embodiment.
Figure 5C:
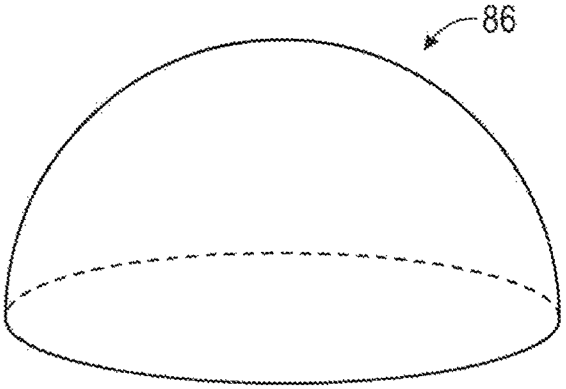
FIG. 5C is an illustration of a touch sensitive input device used with a feedback system, according to one embodiment.

Referring still to FIG. 1, input device 80 is configured to receive an input from the user during the video game. The first data of the primary object is based on the input from input device 80, according to an example embodiment. By way of example, input device 80 may be configured to receive at least one of touch inputs, audible inputs, and motion inputs provided though the movement of input device 80 such that a virtual character performs some action (e.g., moves, turns, shoots, etc.). As shown in FIGS. 5A-5C, input device 80 may include a variety of input devices. As shown in FIG. 5A, input device 80 may include or be a hand-held input device, shown as controller 82. In one embodiment, controller 82 is configured to receive touch inputs in the form of button commands. Additionally or alternatively, controller 82 is configured to receive motion inputs through the user repositioning the controller 82 (e.g., a throwing motion, a punching motion, etc.). As shown in FIG. 5B, input device 80 may include or be a voice recognition device (e.g., a headset/microphone device, etc.), shown as headset 84. Headset 84 may be configured to receive voice commands (e.g., audible inputs, etc.) from the user. As shown in FIG. 5C, input device 80 may include or be a touch sensitive input device, shown as touch sensitive device 86. As shown in FIG. 5C, touch sensitive device 86 is hemispheric in shape. In other embodiments, touch sensitive device 86 is another shape. A user of feedback system 10 may provide touch inputs to the exterior of the touch sensitive device 86 for providing input to control the primary object. In some embodiments, touch sensitive device 86 is configured to provide feedback to a user of feedback system 10. For example, portions of the exterior of touch sensitive device may vibrate or illuminate to provide a user with an enhanced awareness of the virtual environment. In another embodiment, input device 80 includes a wearable input device configured to receive motion inputs from the movement of the user and/or touch inputs. In an alternative embodiment, input device 80 and feedback device 100 are included in a single device, as is described more fully herein.

Figure 3A:
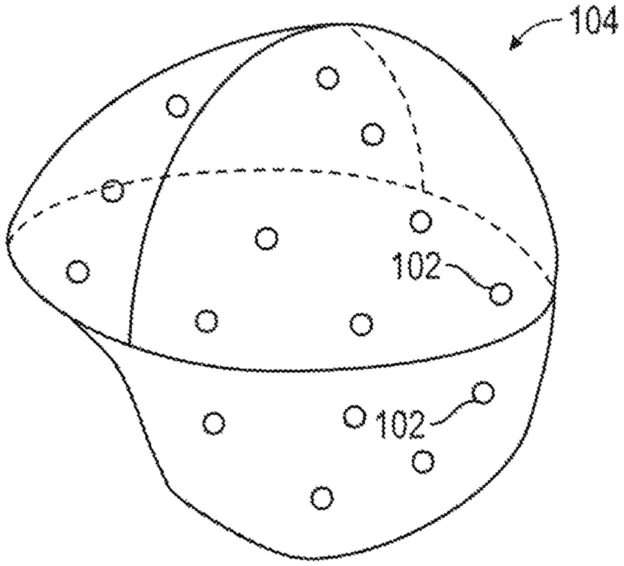
FIG. 3A is an illustration of a wearable headwear feedback device worn by a user of a feedback system, according to one embodiment.
Figure 3B:
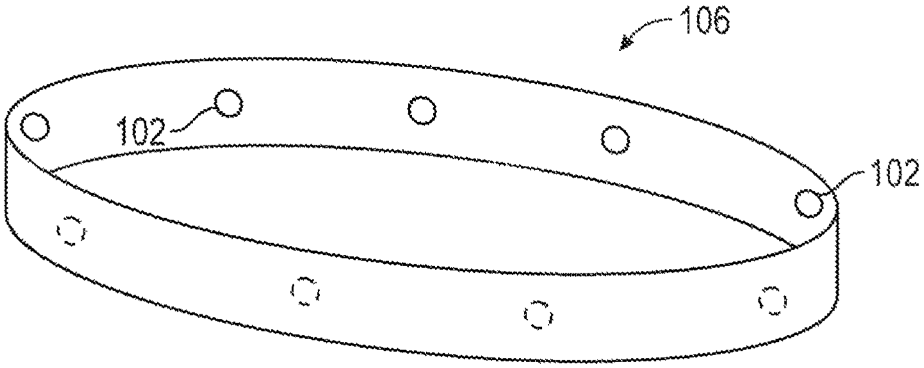
FIG. 3B is an illustration of a wearable band feedback device worn by a user of a feedback system, according to one embodiment.
Figure 3C:
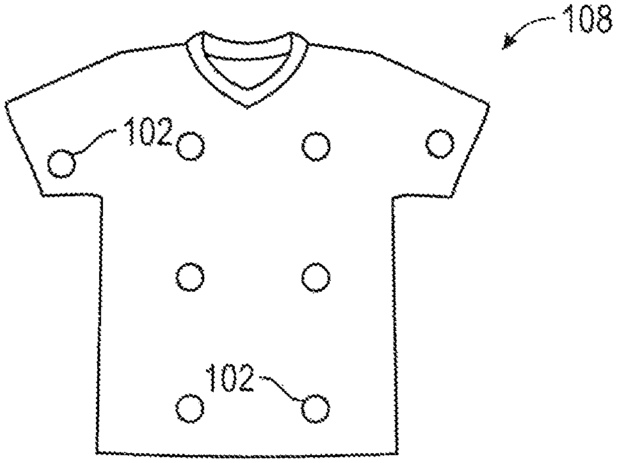
FIG. 3C is an illustration of a wearable clothing feedback device worn by a user of a feedback system, according to one embodiment.

Processing circuit 30 is configured to control operation of feedback device 100 via feedback module 60 based on the data (e.g., first data, second data, event data, etc.) received by sensor module 50. As shown in FIGS. 3A-3C, feedback device 100 may include a variety of wearable feedback devices. The wearable feedback devices include a plurality of feedback elements, shown as elements 102. In one embodiment, elements 102 are configured to provide haptic feedback to the user such that a user has an enhanced situational awareness. Referring to FIG. 3A, in one embodiment, feedback device 100 includes a wearable headgear device, shown as headgear 104, configured to rest on the head of the user of feedback system 10. As shown in FIG. 3A, headgear 104 includes a plurality of elements 102 disposed about headgear 104. In one embodiment, the plurality of elements 102 are equally spaced about headgear 104. In other embodiments, the plurality of elements 102 are selectively positioned around headgear 104 so as to correspond in location to desired anatomical features (e.g., ears, temple, forehead, nape, crown, etc.) of the user. The size of headgear 104 may be varied to fit various users and to accommodate various types of elements 102 (e.g., haptic, visual, audible, etc.).

Referring now to FIG. 3B, feedback device 100 includes a band, shown as band 106, in some embodiments. Band 106 may include one or more elements 102. In one embodiment, band 106 includes a single element 102. In other embodiments, band 106 includes a plurality of elements 102. In one embodiment, elements 102 are equally spaced about band 106. In other embodiments, elements 102 are selectively positioned along band 106 so as to correspond in location to desired parts of a user's body (e.g., an ear or temple area of the head, a wrist, etc.). The size of band 106 may be varied to fit various users or body parts (e.g., a head, a wrist, an ankle, a waist, etc.) and/or to accommodate various types of elements 102. In one embodiment, band 106 is a head band. In other embodiments, band 106 may be a wrist band (e.g., a watch, a bracelet, etc.), an ankle band, an arm band, a leg band, a torso band (e.g., a belt, etc.), or a band to extend about another portion of a user's body.

Referring to FIG. 3C, in other embodiments, feedback device 100 includes an article of clothing, shown as article of clothing 108. As shown in FIG. 3C, article of clothing 108 is a shirt. In other embodiments, article of clothing 108 may be pants, a sock, a shoe, or a glove. In one embodiment, the plurality of elements 102 are equally spaced about article of clothing 108. In other embodiments, the plurality of elements 102 are selectively positioned around article of clothing 108 so as to correspond in location to desired anatomical features (e.g., chest, back, etc.) of the user. The size of article of clothing 108 may be varied to fit various users and to accommodate various types of haptic elements 102. In further embodiments, feedback device 100 includes a combination of articles of clothing 108, including a shirt, pants, a sock, a shoe, and/or a glove. In yet further embodiments, feedback device 100 includes a combination of devices, including headgear 104, one or more bands 106, and/or one or more articles of clothing 108.

According to an example embodiment, elements 102 may be or include a vibratory element configured to provide haptic feedback (e.g., vibrations, mechanical stimulations, etc.) to a user regarding a secondary object or event. For example, element 102 in some embodiments is or includes a vibration device or similar component. In another embodiment, elements 102 of feedback device 100 include an audible element configured to provide audible feedback to a user regarding a secondary object or event. For example, in some embodiments, element 102 is or includes a speaker or similar component. In further embodiments, elements 102 of feedback device 100 include a visual element configured to provide visual feedback to a user regarding a secondary object or event. For example, in some embodiments, element 102 is or includes a light source (e.g., an LED, etc.). In yet further embodiments, feedback device 100 includes a combination of feedback elements, including one or more of haptic, audible, visual, and the like.

Feedback device 100 may provide a user of feedback system 10 with enhanced awareness of his/her surroundings such that he/she may provide an input to input device 80 that corresponds with the feedback. For example, the user may provide a touch input and/or motion input to controller 82 to move a virtual character a certain direction, perform a specific task, or the like based on the feedback received. By way of another example, the user may provide a voice command to headset 84 to control the actions of the primary object, provide team members with information regarding enemies (e.g., players on another team, etc.) based on the feedback, and the like based on the received feedback from feedback device 100. By way of yet another example, the user may provide touch sensitive inputs to touch sensitive device 86. The relative locations of touch sensitive device 86 may substantially correspond to the feedback provided by feedback device 100. For example, the user may feel a vibratory sensation on the back of his/her head from headgear 104. The user may associate the location of the haptic feedback on their head to the near side (i.e., the side closest to the user, etc.) of touch sensitive device 86. By touching the corresponding location on touch sensitive device 86, the virtual character may move accordingly. For example, the virtual character may turn towards the inputted direction, begin moving in the inputted direction, or start shooting in the inputted direction, among other alternatives.

In alternative embodiments, feedback device 100 and input device 80 are provided by a single device such that the single device provides both input to processing circuit 30 (e.g., to control the virtual character, etc.) and output/feedback to the user (e.g., to provide enhanced situational awareness, etc.). For example, touch sensitive device 86 may be integrated into headgear 104 such that a user may provide a touch input directly in the location the feedback is experienced. By way of example, if haptic feedback is provided to the temple of the user (e.g., indicating an enemy to their side, etc.), the user may touch the temple location on their head, and touch sensitive device 86 may take appropriate action (e.g., turn in the direction of the touch input, etc.). In some embodiments, feedback devices 100 such as headgear 104, band(s) 106, and/or article(s) of clothing 108 are configured to provide input to feedback system 10 through motion/movement of the user. By way of example, feedback devices 100 may include motion sensors that track the movement of a portion of the user (e.g., an arm, a leg, etc.). For example, a user may turn his/her head and headgear 104 may track the motion and provide input such that the virtual character turns or looks accordingly. By way of another example, the user may be wearing bands 106 on his/her wrists such that bands 106 provide input regarding the location of the virtual characters hands/arms based on the movement of the users hands/arms (e.g., such as the motion of the user's arm when throwing a punch in a fighting game, etc.). In some embodiments, both sensor system 90 (e.g., via a camera system, etc.) and feedback device 100 (e.g., headgear 104, bands 106, clothing 108, etc.) track the movement of the user. Feedback system 10 may then compare the motion data gathered by both sensor system 90 and feedback device 100 to provide a more accurate input to control movements and actions of the primary object.

Figure 2:
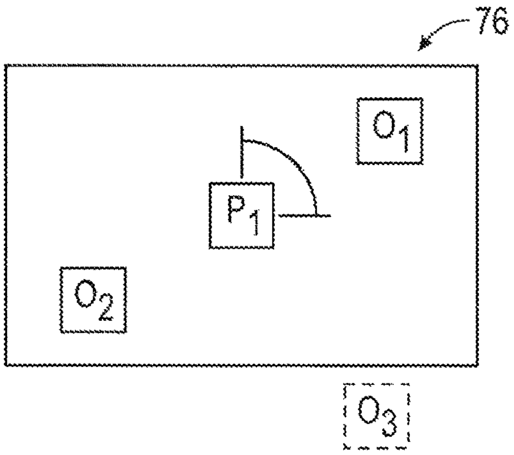
FIG. 2 is a schematic illustration of a primary object in a surrounding virtual environment displayed on a display device, according to one embodiment.

Referring now to FIG. 2, elements 102 are configured to be selectively and dynamically activated and deactivated based on an orientation of the head of the primary object (e.g., $P_1$, etc.) relative to the secondary object(s) (e.g., $O_1$, $O_2$, etc.). As shown in FIG. 2, secondary objects $O_1$ and $O_2$ are in close proximity (e.g., pose a possible threat, etc.) to primary object $P_1$ within virtual environment 76, while secondary object $O_3$ is not within close proximity (e.g., does not pose a threat, substantially far from primary object $P_1$, etc.). In one embodiment, feedback device 100 provides the user with feedback such that the user has a heightened awareness of the secondary objects and/or threats outside of his/her field of view. For example, as shown in FIG. 2, secondary object $O_2$ is not within the field of view of primary object $P_1$ such that user is not able to see secondary object $O_2$ on display device 70. In other embodiments, feedback device 100 further provides the user with feedback for secondary objects within the user's field of view to reinforce the intuitive understanding of what each vibration (or other feedback signal such as audible or visual) represents as described more fully herein. For example, as shown in FIG. 2, secondary object $O_1$ is within the field of view of primary object $P_1$ such that user is able to see secondary object $O_1$ on display device 70. In one embodiment, feedback device 100 provides the user with feedback when the primary object $P_1$ and a secondary object are not in contact. In some embodiments, feedback device 100 also provides the user with feedback when the primary object $P_1$ and a secondary object are in contact (e.g., a punch or kick hitting the primary object, etc.).

According to one embodiment, feedback device 100 provides two dimensional information (e.g., left, right, front, back, etc.) to a user regarding the position of the secondary object in relation to the primary object. For example, if the secondary object is behind the primary object, feedback device 100 may provide haptic feedback (or another type of feedback) via elements 102 to a rear portion of the user (e.g., back, rear of head, rear of neck, etc.) to make the user aware of the unseen secondary object behind the primary object. In other embodiments, feedback device 100 provides three dimensional information (e.g., up, down, up at an angle, etc.) to the user regarding the position of the secondary object in relation to the primary object. For example, if the secondary object is to the side and above the primary object, feedback device 100 may provide haptic feedback via elements 102 to a side portion of the user (e.g., between the top and side of the user's head, etc.). In another example, the feedback system 100 may provide visual feedback via elements 102 by flashing a light in the users peripheral vision (e.g., on the side the secondary object is located, etc.) or emitting an audible tone in an ear corresponding to a location of the secondary object with respect to the users view of the virtual environment (e.g., emitting an audible tone in the right ear of a user when a secondary object is located somewhere on the right side of the users view of the virtual environment, etc.).

According to an example embodiment, elements 102 of feedback device 100 provide metadata denoting situations within the video game (i.e., not only directional information, etc.). By way of example, feedback module 60 may be configured to vary the frequency, amplitude, and/or waveform of vibrations of elements 102 to provide indications of different types of information to the user regarding the primary object and/or the secondary object based on the first data, the second data, and/or the event data. In one embodiment, elements 102 denote a change in relative position between the primary object and the secondary object. In further embodiments, the feedback is configured to provide an indication of a relative distance, a relative velocity, an absolute velocity, a relative acceleration, and/or an absolute acceleration between the primary object and the secondary object. For example, the frequency of vibratory feedback may be increased or decreased with the relative velocity of the secondary object (e.g., another user controlled character, computer controller character or object, etc.), and the amplitude of the vibratory feedback may be increased/decreased with the relative distance between or proximity of potentially threatening objects. As such, in one embodiment, as the relative velocity between the primary object and the secondary object increases and the distance decreases, the vibratory feedback may increase in frequency and amplitude. Conversely, should the user take action to avoid the secondary object (e.g., by slowing down, changing direction, etc.) to decrease the relative velocity between users and/or increase the distance, the vibratory warning may decrease in frequency and amplitude.

In yet further embodiments, the feedback is configured to provide an indication of an affiliation and/or a threat level/nature of the secondary object. For example, non-threatening objects (e.g., allies, teammates, etc.) may be ignored (e.g., no feedback is provided, etc.). On the other hand, threatening objects (e.g., enemies, players on other team, opponents, etc.) may cause control system 20 to provide feedback to the user via feedback device 100. Likewise, the feedback may vary in amplitude, frequency, and/or waveform based on a threat intensity. For example, a high threat object (e.g., a boss character, a high skilled player, etc.) may cause a more frequent and higher amplitude vibratory response from elements 102. Conversely, a low threat object (e.g., low skilled player, minion, etc.) may cause a less frequent and lower amplitude vibratory response. In some embodiments, feedback device 100 further provides the user with various intensities of feedback based on the direction between the primary object and the secondary object relative to an orientation of the primary object and/or an orientation of the secondary object. For example, a secondary object may be classified as a high threat object if the secondary object is looking at the primary object or a low threat object if the secondary object is looking away from the primary object. As another example, a secondary object may be classified as a high threat object if the primary object is not looking at the secondary object or a low threat object if the primary object is looking at the secondary object.

In some embodiments, feedback device 100 is configured to provide directional information to the user. In one embodiment, the directional information indicates a proposed direction of movement of the primary object. By way of example, in a racing game, feedback device 100 may provide directional cues to notify the user of an upcoming turn in a race track. By way of another example, feedback device 100 may provide the user with haptic feedback to propose a direction of travel such that the user leads a virtual character along a certain path, towards a secondary object, away from a threat, among other possibilities. In other embodiments, the directional information indicates a direction of virtual gravity. For example, in some games, a virtual character may become disoriented (e.g., from an explosion, etc.) and not be able to gain bearing for a certain amount of time. In this instance, feedback device 100 may provide directional cues to reorient the user of the virtual character with the virtual environment (e.g., such as the direction of virtual gravity, etc.). In additional embodiment, the directional information provides an indication of a specific point or locations of interest. For example, the points may be static points such as a home base or planet, or the points may be moving such as targets (e.g., enemies, etc.) that the user may be tracking or being tracked by. The static points may be valuable during combat or other types of play to orient the user with where the user is headed or with what the user is guarding during moments of disorientation.

In some embodiments, feedback system 10 is configured to recognize boundaries and provide feedback through feedback device 100 based on the respective boundary. For example, feedback device 100 may warn a user of an upcoming cliff or obstacle. By way of another example, feedback device 100 may lead a user to a doorway or passage. By way of yet another example, feedback device 100 may recognize and notify a user of walls or virtual boundaries (e.g., such as in dark caves, holorooms, etc.) that the user may or may not be able to see.

In some embodiments, feedback system 10 monitors the status of a user's team or enemy team and relays information regarding the status to each user. For example, feedback system 10 may provide feedback to a user when a player is killed via feedback device 100. In one embodiment, feedback device 100 provides haptic feedback to inform the players of how many players are alive or dead via a number of vibrations. In other embodiments, the feedback may be an auditory message (e.g., such as "player X has been killed", "five players remain", etc.).

Parameters in which the feedback is provided to a user may be modified by at least one of the user based on preference and control system 20 based on a chosen difficulty setting (e.g., easy, medium, hard, etc.), according to an example embodiment. For example, a range (e.g., distance, etc.) in which the user is first alerted of a secondary object may be altered via a user chosen setting or predefined by the game difficulty selected by the user. Similarly, the user may choose the type of objects for which to be alerted about (e.g., enemies, friendlies, based on threat level, nature, etc.). In one embodiment, a squelch function is used to tune out (e.g., suppress, etc.) excess noise (e.g., non-threatening objects, etc.).

In other embodiments, feedback device 100 includes a speaker (e.g., external speaker, head phones, ear buds, etc.) configured to provide audible feedback (e.g., an audible warning or notification, etc.) to a user. The speaker may be implemented in any suitable location, and any suitable number of speakers may be utilized. In some embodiments, multiple speakers may be utilized. The speakers may be worn on or within one or both ears of a user. In one embodiment, the speakers are stereophonic such that a stereophonic warning is provided to users by way of feedback device 100. While in some embodiments the speakers are worn by a user (e.g., on an ear, etc.), in other embodiments, the speakers are carried by another piece of equipment, such as headgear 104, a vehicle, etc. The pitch, volume, tone, frequency, and other characteristics of an audible warning/notification may be varied to provide indications of direction, relative position, relative velocity, absolute velocity, relative acceleration, absolute acceleration, affiliation, threat level, nature, and the like to the user.

In some embodiments, feedback system 10 uses multichannel audio information to localize the origin of sounds in a game and converts the sound information to feedback (e.g., haptic feedback, etc.) that indicates the virtual spatial location of the audio to the user. Feedback device 100 may connect (via any suitable wireless or wired protocol) to an audio output of the machine (e.g., game console, computer, smart phone, tablet, audio receiver, etc.) and obtain three-dimensional audio information. Multi-channel audio operates by varying the intensity and timing of sounds to create the illusion that the sounds are being generated from a specific spatial location relative to the hearer. Feedback system 10, via processing circuit 30, may interpret raw multi-channel audio information and determine where sounds are arising from relative to the user. Processing circuit 30 may then convert the audio information into feedback to help the user better identify where the sounds are coming from. In turn, processing circuit 30 is configured to provide, for example, haptic feedback to a user via feedback device 100 to indicate specific range, elevation, and/or bearing information that may be substantially easier to interpret than audio coming from headphones or a surround sound system. This may be particularly useful in an electronic game that outputs multi-channel (e.g., 6-channel, etc.) audio where the user is only using stereo headphones. Converting the multi-channel audio information into haptic feedback may substantially increase a user's competitive advantage in the electronic game. The user may be able to more quickly identify, for example in a first-person shooter game, where shots are coming from than if the user were solely using the stereo headphones. For example, if a virtual character is being shot at in a first-person shooter game, and the user cannot locate where it is coming from, feedback device 100 may provide the user with haptic feedback to allow the user to identify the origin (i.e., the location relative to the virtual character, etc.) of the sound (e.g., a gunshot, etc.). This also facilitates the integration of feedback system 10 with an electronic game without the electronic game's source code supporting feedback system 10.

The same general concept may be generalized to convert many different types of in-game information into feedback. For example, many electronic games display a "bird's eye view" map, showing the location and/or orientation of the primary object, team members of the user of the primary object, and/or secondary objects (e.g., opponents, enemies, etc.) within a virtual environment. Processing circuit 30 may interpret this visual information and convert it to feedback, thereby not requiring the user to actually look at the in-game map. There are numerous other features expressed visually within an electronic game that may also be converted to feedback to be provided to a user of feedback system 10.

In further embodiments, feedback device 100 includes one or more lights configured to provide visual warnings or notifications to a user. For example, one or more lights (e.g., LEDs, etc.) may be provided within headgear 104 (e.g., to the peripheral side of each eye, etc.). A brightness, a color, a blinking frequency, or other characteristic of the light may be varied to provide indications of direction, relative position, relative velocity, absolute velocity, relative acceleration, absolute acceleration, affiliation, threat level, nature, and the like to the user.

According to an example embodiment, elements 102 of feedback device 100 (e.g., haptic elements, visual elements, audible elements, etc.) are activated based on conditions or settings within the game corresponding with the event data and/or actions taken by the primary and secondary object (e.g., indicated by the first data and the second data, etc.). The use and/or availability of feedback with a game may be controlled by control system 20 responsive to the event data, the first data, and/or the second data. In one embodiment, the availability of feedback is based on the game level/situation or a change thereof. By way of example, feedback may be disabled or scrambled (e.g., false feedback provided, mis-calibrated, etc.) by control system 20 during a portion of a game to increase the difficulty. By way of another example, feedback may be disabled during a situation where the primary object (e.g., virtual character) becomes disoriented (e.g., from a flash bang grenade in a war game, etc.). By way of yet another example, as the user progresses through the game and reaches new checkpoints, milestones, and/or levels, the availability of the feedback may change (e.g., decrease, increase, etc.). For example, feedback may be disabled or hindered during a portion of the game when the primary object controlled by the user is facing a boss character or a character with a feature/ability/perk to disable/hinder feedback abilities.

In another embodiment, the availability of feedback is based on a primary object's or a user's experience, performance, and/or skills. For example, a virtual character with better attributes (e.g., strength, speed, aim, etc.), perks (e.g., special weapons, powers, etc.), and/or skills than other virtual characters may not be compatible with a feedback feature. In another example, a user may be rewarded the ability to activate feedback based on a level of skill (e.g., reaching a certain rank, level, prestige, etc.). In other embodiments, the availability of feedback is based on the performance of other users or secondary objects within the game. For example, if a secondary object is outperforming the primary object, the user of the primary object may be allowed to implement feedback capabilities, while the user of the secondary object may have feedback capabilities reduced or disabled.

In some embodiments, the availability of feedback is based on a current virtual environment. By way of example, feedback may be disabled in a harsh environment of the electronic game (e.g., during a storm, in a dark cave, etc.). In additional embodiments, the availability of feedback is based on a difficulty setting of the game. By way of example, a user playing a game on a relatively easy setting may be provided substantial amounts of feedback to enhance their awareness within the game and aid in the reduction of the difficulty. While a user playing a game on a relatively difficult setting may be provided with minimal amounts of feedback or none at all to increase the difficulty. In further embodiments, the availability of feedback is based on the purchase or acquisition of feedback within the game or from a game marketplace (e.g., an app store, etc.). For example, feedback may be treated like a special item or skill that is purchasable (e.g., via points/virtual money earned during game play, etc.) within the game to increase the awareness of the virtual character (i.e., the user of the virtual character, etc.) regarding the surrounding virtual environment and secondary objects. In another example, feedback may require an additional purchase not included with the game from a store (e.g., an electronics retail store, etc.) or online game marketplace. In other embodiments, the availability of feedback is based on an operational mode of feedback device 100 (e.g., on, off, an active state, an inactive state, etc.). In some embodiments, the availability of feedback is based on any combination of the aforementioned event data (e.g., a level, a situation, a difficulty setting, a current virtual environment, a performance level of the user, a performance level of other users, etc.).

In an alternative embodiment, the availability of feedback is based on an operational mode of feedback device 100. According to an example embodiment, feedback device 100 is operable in a first mode of operation (e.g., an active state, an on state, etc.) and a second mode of operation (e.g., an inactive state, a standby state, an off state, etc.). In one embodiment, the first operational mode and/or the second operational mode indicate a specified sensitivity setting for feedback device 100. The specified sensitivity setting may be user defined or processor controlled. The specified sensitivity setting may indicate an amount of feedback output for a given input (e.g., distance based, threat based, etc.). In another embodiment, the first operational mode and/or the second operational mode indicate a specified event responsiveness for feedback device 100 (e.g., an amount of feedback for certain events or situations, etc.). In other embodiments, the first operational mode and/or the second operational mode indicate a specified feedback presentation for feedback device 100 to provide to a user (e.g., visual, audible, or tactile feedback; a frequency, amplitude, etc.). In some embodiments, the first operational mode and/or the second operational mode indicate a specified availability for feedback device 100 to provide feedback to a user.

In one embodiment, the operational mode of feedback device 100 is controlled by a user (e.g., by pressing an on/off button, etc.). In another embodiment, the operational mode of feedback device 100 is controlled by control system 20. Control system 20 may be configured to reconfigure feedback device 100 between the active state and the inactive state based on at least one of the event data, the first data, user data, and the second data (as described above with regards to the availability of the feedback). In one embodiment, the possession, settings, or operational mode of the feedback device is represented within an electronic game by a tertiary object (e.g., an item the user may pick up or obtain with the primary object, etc.). For example, control system 20 may activate feedback capabilities in response to a user obtaining a certain item (representing feedback device 100) within a game.

According to another example embodiment, feedback device 100 is controlled by control system 20 to operate better (e.g., be more sensitive to surroundings, etc.) for some primary or secondary objects than others. For example, some enemies (e.g., other players, virtual characters, etc.) may not be detected as well as others, such as ninjas or leopards. In one embodiment, a user is able to purchase or acquire an invisibility/sneakiness skill or ability for a primary object such that an opponent's feedback device 100 does not notify the opponent of the user's primary object. In another embodiment, a user is able to purchase or acquire a disruption skill for a primary object such that an opponent's feedback device 100 provides false feedback (e.g., provides corrupt directional feedback, introduces fake objects, etc.) to the opponent. In still another embodiment, a user may choose to use another character's perspective (e.g., of a teammate or opponent with or without permission, etc.). For example, a user may use a teammate's virtual character's perspective to gain a greater awareness of threats ahead or in another location of the virtual environment.

According to yet another example embodiment, processing circuit 30 is configured to control the operation of elements 102 to provide a sense of at least one of a presence, a distance, and a direction of an object relative to the user of feedback device 100. The feedback may be based on at least one of a distance of an object (e.g., secondary object, another person, etc.) relative to the user (or primary object), a direction of the object relative to the user, a nature/threat level of the object, and a user response to previously-provided feedback. The feedback provided by elements 102 may include, but are not limited to, a vibration, a stroke or swipe, an acoustic stimulation, a visual stimulation, a temperature change, a moisture change, a lubrication, and/or an electrical stimulation. The vibration may be provided by a vibratory element. The stroke or swipe may be provided by a plurality of vibratory elements actuated in succession, simultaneously, and/or in a specific pattern (e.g., the vibratory elements are arranged in a linear pattern such that each may provide vibratory feedback to a user along the pattern, etc.). The temperature change may be provided by a heating/cooling element (e.g., a resistive heating element, a heating element that utilizes a chemical reaction, a fan, etc.). The moisture or lubrication may be provided by a nozzle attached to a fluid reservoir (e.g., a water tank, etc.) or a humidifying material or device. The electrical stimulation may be provided by a device configured to provide electrical impulses (e.g., electrical muscle stimulation, etc.).

In one embodiment, the feedback is derived from, modulated by, and/or accompanied by audio information. By way of example, using audio information, feedback device 100 may provide a user with feedback derived from the audio information indicating where a sound is coming from. By way of another example, in a situation where music within an electronic game changes, processing circuit 30 may modulate the feedback based on the music. For example, a change in the background music may indicate an intense or more difficult portion of the electronic game is occurring, where processing circuit 30 may adjust the feedback based on the situation. By way of yet another example, the feedback may be provided in the form of or accompanied by an audio output (e.g., audible feedback, from a speaker, etc.), as described above. The audio information may include a musical score, a tone, a notification, etc. In another embodiment, the feedback is accompanied by visual information supplied to the user of feedback system 10 or visual information is withdrawn from the user. By way of example, feedback device 100 may include a visual element, such as an LED light, configured to provide visual feedback. By way of another example, processing circuit 30 may provide a visual indication on display device 70 or remove the visual indication from display device 70. For example, processing circuit 30 may provide visual feedback in the form of a message (e.g., a warning, an update, etc.) or direction arrow (e.g., indicating a direction of an object, etc.) on display device 70.

In one embodiment, processing circuit 30 is configured to provide feedback to the user of feedback device 100 based on a feedback actuation function. The feedback actuation function may include a presence actuation function, a distance actuation function, and/or a direction actuation function. The presence actuation function is configured to provide a sense of a presence of an object (e.g. another person, a secondary object, within a proximity of the user or primary object, etc.). The sense of the presence may include a sense of a scale, an energy, a mass, a movement capability, a nature, and a threat level of the object, among other possibilities. The presence actuation function may provide a user or give the user the ability to provide a sense of a threat or friendliness. For example, a user may receive feedback from another person, such as a stroke along the back or a hugging sensation, to provide a sense of comfort. This may be implemented in situations such as a parent providing comfort to his/her premature baby that is isolated from physical contact or family members living apart from one another and being able to give a loved one a simulated hug, among other examples.

The distance actuation function is configured to provide a sense of a distance of an object relative to the user or primary object. The direction actuation function is configured to provide a sense of a direction of an object relative to the user or primary object. The relative priority of the presence actuation function, the distance actuation function, and the direction actuation function may vary responsive to the distance, the direction, and the nature of the object relative to the user or primary object. In some embodiments, the feedback actuation function is based on the relative position of elements 102 on the user of haptic feedback device 100, the relative position of the user, and/or the relative position of the object. By way of example, feedback may need to be provided in a desired location, however the position of elements 102 may not facilitate the application of feedback in the desired location. Therefore, the feedback actuation function may actuate various elements 102 around the desired location. For example, processing circuit 30 may actuate elements 102 in a circular pattern around the desired location to indicate the location in which feedback is desired to be provided.

The feedback actuation function may be a continuous function, a discrete function, a linear function, a non-linear function, or any combination thereof By way of example, the distance actuation function may increase an amplitude of the feedback linearly as an object (e.g., another person, a secondary object, etc.) gets closer to the user or primary object, or vice versa (e.g., inversely proportional to the distance, etc.). By way of another example, the distance actuation function may increase the amplitude of the feedback non-linearly (e.g., exponentially, quadratically, etc.) as an object (e.g., another person, a secondary object, etc.) gets closer to the user or primary object, or vice versa.

In one embodiment, processing circuit 30 is configured to modify the feedback actuation function responsive to a user response to previously-provided feedback (e.g., reduce, amplify, alter, etc.). The user response may include, but is not limited to, a body movement, a head movement, a temperature, a heart rate, a skin conductivity, a facial expression, a vocal expression, pupil dilation, brain waves, and/or a brain state. By way of example, processing circuit 30 may actuate various elements 102 as a user of feedback device 100 rotates his/her head. For example, processing circuit 30 may provide a vibration to a side of a user's head to indicate an object is to the user's side. As the user turns his/her head, the direction actuation function may modify which elements 102 provide feedback to the user such that the vibrations move as the user's head turns until the user's head is facing the indicated direction (e.g., the vibrations may move counter-clockwise as the user turn his/her head clockwise, etc.). The various functions disclosed herein may be embodied as instructions or programs implemented on or accessed by feedback system 10. In one embodiment, the instructions and/or programs are stored locally in memory (e.g., memory 38, etc.) of feedback system 10. In another embodiment, the instructions and/or programs are accessed via any suitable wired or wireless communication protocol to an external memory or via the Internet. Access to the Internet may provide for the ability to update the instructions and/or programs of feedback system 10 (e.g., periodically, when an update is released, etc.).

According to the example embodiment shown in FIGS. 1 and 6-8C, feedback system 10 (e.g., situational awareness system, etc.) is configured to provide feedback for real-world applications. For example, feedback system 10 may be used for driving, treatment for sight or hearing-impaired persons, aviation, sports, combat, etc.

Figure 6:
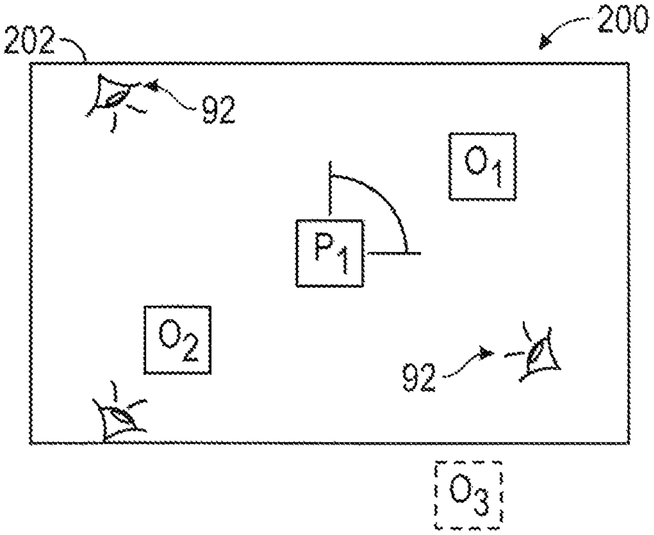
FIG. 6 is a schematic illustration of a user of a feedback system in an area, according to one embodiment.

Referring now to FIG. 6, area 200, usable in connection with feedback system 10, is shown according to one embodiment. As shown in FIG. 6, area 200 includes a ground surface 202 upon which a user, such as user $P_1$ (e.g., an athlete, a motor vehicle operator, a military personnel, etc.), is moving. In some embodiments, user $P_1$ is participating in an athletic event (e.g., a paintball game, football game, an automotive race, etc.) where opponents (e.g., other users, other vehicles, etc.), such as opponents $O_1$, $O_2$, and $O_3$, or other obstacles (e.g., walls, posts, vehicles, etc.) are present.

In one embodiment, area 200 includes one or more external sensors 92 (e.g., remote sensors, etc.) configured to acquire external data (e.g., second data, etc.). External sensors 92 are positioned around or within area 200, and configured to acquire various data regarding area 200, the user $P_1$, and/or opponents $O_1$, $O_2$, and $O_3$. External sensors 92 may include any suitable sensors configured to detect the position, movement (e.g., velocity, acceleration, etc.), identity (e.g., team affiliation, etc.), etc. of the user $P_1$ and/or opponents $O_1$, $O_2$, and $O_3$. As discussed in further detail below, additional sensors may be worn by user $P_1$ (e.g., as part of a head protection device, torso protection device, leg protection device, one or more head, wrist or ankle bands, as part of a team uniform, etc.) and used to acquire data regarding various users, objects, or a surrounding area.

Figure 7:
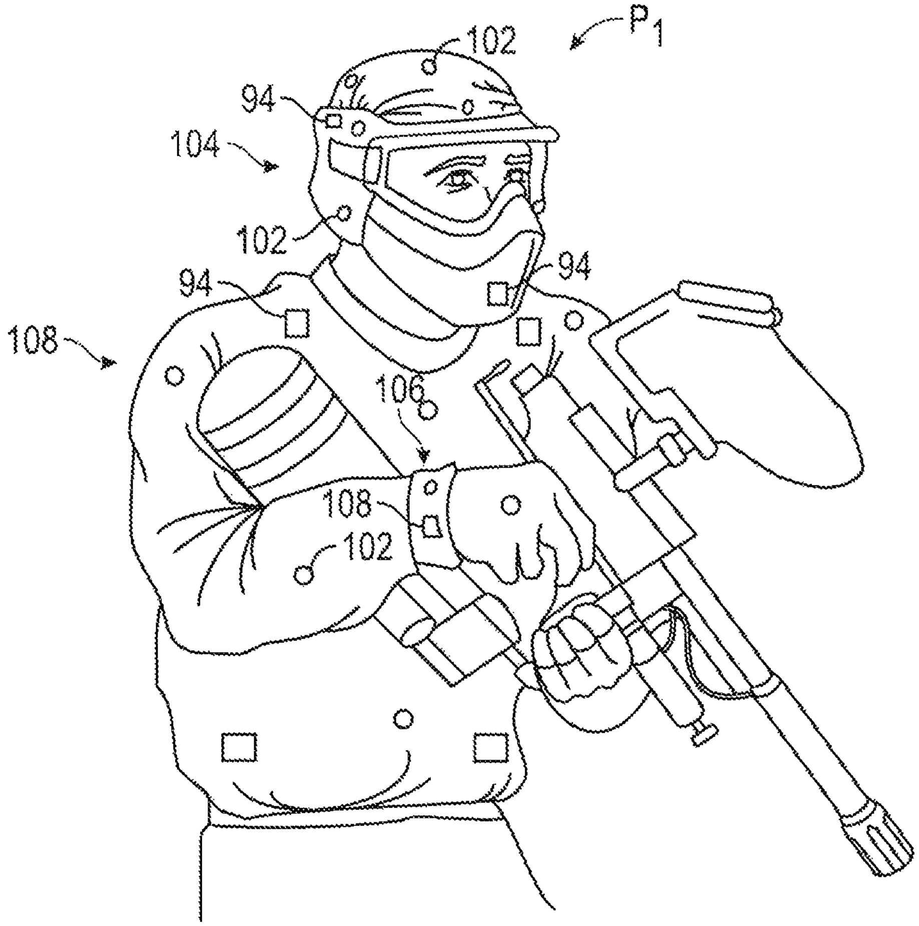
FIG. 7 is an illustration of a user of a haptic system, according to one embodiment.

Referring now to FIG. 7, user $P_1$ is a paintball player. In other embodiments, user P may be a racecar driver, a football player, a soldier, or another person using feedback system 10. As shown in FIG. 7, user sensors 94 are configured to be worn by, carried by, or travel with a user such as user $P_1$. User sensors 94 may be positioned at various locations about one or more pieces of equipment or clothing worn by user $P_1$. In one embodiment, user sensors 94 are provided in or on headgear 104 (e.g., a helmet, a head protection device, etc.). In some embodiments, user sensors 94 are provided on one or more articles of clothing 108 or bands 106, such as a uniform, jersey, shirt, pants, or a head or wrist band, etc. In other embodiments, opponents $O_1$, $O_2$, and/or $O_3$ wear at least one of headgear 104, bands 106, and clothing 108 including user sensor 94 and use feedback system 10.

User sensors 94 may be or include a wide variety of sensors configured to acquire various types of data regarding user $P_1$ (e.g., user data, first data, etc.), area 200, opponents $O_1$, $O_2$, and $O_3$ (e.g., second data, etc.), and the like. For example, in one embodiment user sensors 94 are configured to acquire user data regarding a user wearing user sensors 94. The user data may include a position of the user, an acceleration and/or velocity of the user, positions and/or orientations of various body parts of the user, and so on. In some embodiments, user sensors 94 are configured to acquire user data regarding other users or objects (e.g., in addition to or rather than the user wearing sensors 94). The user data may include a position of another user, an acceleration and/or velocity of the other user, positions and/or orientations of various body parts of the other user, an affiliation of the other user, and so on. In addition, various data may be obtained in absolute terms (e.g., position, velocity, acceleration) and transformed into relative terms for two or more users (e.g., by comparing absolute values of various users, etc.).

In one embodiment, user sensors 94 are or include an inertial sensing device, such as an accelerometer, a gyroscope, and the like. In other embodiments, user sensors 94 are or include an image capture device, such as a still image and/or video camera. In further embodiments, user sensors 94 include a GPS receiver. In addition to such passive sensors, user sensors 94 may in some embodiments be or include an active sensor, such as a lidar system, radar system, sonar system (e.g., an ultrasonic sonar or sensing system), etc.

In other embodiments, user sensors 94 are configured to provide data regarding team affiliations of various users. For example, user sensors 94 in some embodiments are or include a beacon, such as an RFID tag, that may be carried by each user. The RFID tags may provide team affiliation data, and may provide user-specific data, such as a user height, weight, etc. (e.g., through near field communication, etc.). In one embodiment, the beacons communicate with one another. In other embodiments, signals from the beacons are received by external sensors 92 to be provided to control system 20.

In one embodiment, user sensors 94 are configured to determine an orientation of a user's head (e.g., a direction in which the user is facing, a tilt of the head relative to the horizon, etc.). As such, user sensors 94 may be spaced about the user's head to form a sensor array configured to acquire positional data regarding the orientation of the user's head.

In some embodiments, feedback system 10 is implemented as part of a vehicle operator system, such that one or more user sensors 94 are provided as part of a vehicle. For example, a vehicle may include one or more user sensors 94 configured to provide sensor data to control system 20 regarding other vehicles or objects. Furthermore, the vehicle (e.g., a vehicle computer or control system, etc.) may be configured to provide additional data regarding operation of the vehicle, such as information regarding velocity, acceleration, braking conditions, and the like. A user (e.g., a motorcycle operator, a racecar driver, a bicycle rider, etc.) may wear a head protection device such as headgear 104 (e.g., helmet such as a football, baseball, or hockey helmet, a motorcycle or bicycle helmet, a soldier helmet, a ski helmet, etc.) configured to house additional user sensors 94 and/or portions of control system 20 and provide feedback. For example, feedback may be provided to a driver of a first vehicle to indicate that a driver of a second vehicle is in the blind spot of the driver of the first vehicle. As a result, the feedback may substantially reduce the likelihood of a collision between the two vehicles.

Referring back to FIG. 6, the various sensors (e.g., external sensors 92, user sensors 94, etc.) acquire data regarding user $P_1$, opponents $O_1$, $O_2$, $O_3$, and/or area 200 and provide the data to control system 20. Control system 20 is configured to control operation of feedback device 100 to provide haptic feedback to user $P_1$ based on the data received from senor system 90 (e.g., external sensors 92, user sensors 94, etc.). For example, referring further to FIG. 6, user $P_1$ is shown to be within area 200, along with opponents $O_1$ and $O_2$. Opponents $O_1$ and $O_2$ are in close proximity (e.g., pose a possible threat, etc.) to user $P_1$, while opponent $O_3$ is not within a close proximity (e.g., does not pose a threat, substantially far from user $P_1$, not in play, etc.). As such, based on sensor data (e.g., head orientation, affiliation, position, movement, external data, user data, etc.) from sensor system 90, control system 20 is configured to provide feedback to user $P_1$ via feedback device 100. In one embodiment, feedback device 100 provides the user with feedback such that the user has a heightened awareness of the opponents and/or threats outside of his/her field of view. For example, opponent $O_2$ is not within the field of view of user $P_1$ such that user $P_1$ is unable to see opponent $O_2$. In other embodiments, feedback device 100 further provides the user with feedback for opponents within the user's field of view to reinforce the intuitive understanding of what each vibration or other type of feedback (e.g., audible, visual, etc.) represents or to establish an affiliation of the person in the user's field of view. For example, opponent $O_1$ is within the field of view of user $P_1$ such that user $P_1$ is able to see opponent $O_1$.

Figure 8A:
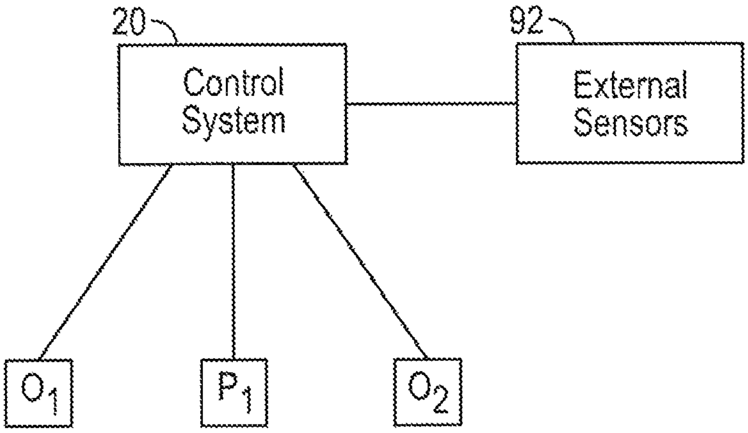
FIG. 8A is a block diagram illustrating communication from users to a control system of a feedback system, according to one embodiment.
Figure 8B:
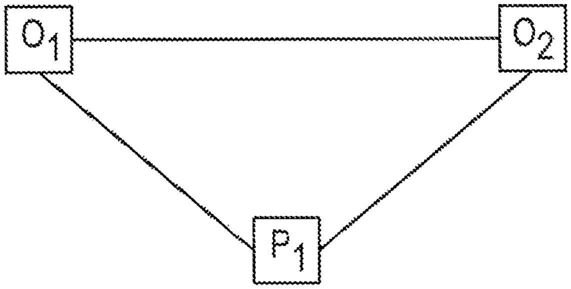
FIG. 8B is a block diagram illustrating communication between users of a feedback system, according to one embodiment.
Figure 8C:
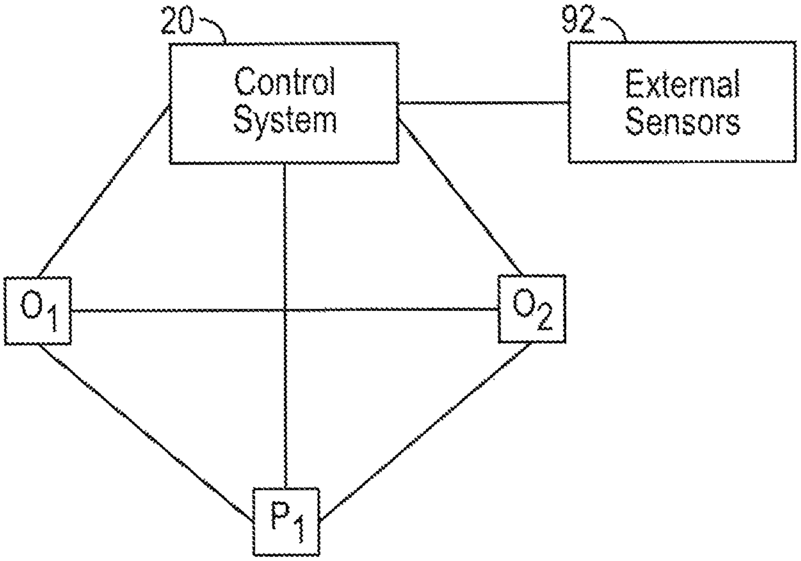
FIG. 8C is a block diagram illustrating communication between users and a control system of a feedback system, according to one embodiment.

Referring now to FIGS. 8A-8C, user $P_1$, opponents $O_1$ and $O_1$, sensor system 90, and/or control system 20 may communicate with each other in a variety of ways, using any suitable wired and/or wireless communications protocols. User $P_1$ generally includes one or more user sensors 94 and one or more feedback devices 100 (see, e.g., FIG. 7). In one embodiment, control system 20 is implemented as a remote system configured to communicate with one or more users of feedback system 10 (e.g., via corresponding feedback devices 100, etc.). For example, referring to FIG. 8A, user $P_1$, opponent $O_1$, and opponent $O_2$ are configured to communicate user data to control system 20, which is in turn configured to receive external data from external sensors 92. Control system 20 is configured to provide feedback to each user based on at least one of user data and external data to increase the awareness of each user regarding threats around them (e.g., opponents, etc.).

In other embodiments, control system 20 is implemented into equipment worn, carried, or otherwise moving with the users of feedback system 10, such that the devices of user $P_1$ and opponents $O_1$ and $O_2$ can communicate directly with one another. For example, referring to FIG. 8B, user sensors 94 are configured to acquire user data regarding user $P_1$ and/or opponents $O_1$ and $O_2$. Based on the user data, control system 20 of the respective user (e.g., user $P_1$, opponent $O_1$, etc.) is configured to provide feedback to the user. In one embodiment, users with the same affiliation (e.g., same team, etc.) communicate with one another (e.g., regarding feedback received, etc.) such that a user may receive advanced notification of opponents/enemies near other users with the same affiliation. This example embodiment is able to be used in ad hoc environments (e.g., unfamiliar environments, hostile environments, environments without external sensors 92, etc.). For example, the configuration shown in FIG. 8B may be implemented with soldiers in hostile environments or for training purposes.

In further embodiments, user $P_1$, opponent $O_1$, and/or opponent $O_2$ are configured to communicate user data to at least one of control system 20 and other users/opponents, which are in turn configured to receive external data from external sensors 92. For example, referring to FIG. 8C, control system 20 is configured to provide feedback to each user based on at least one of the user data and the external data to increase the awareness of each user regarding threats around them (e.g., opponents, etc.). In one embodiment, users with the same affiliation (e.g., same team, etc.) communicate with one another (e.g., regarding feedback received, etc.) such that a user may receive advanced notification of opponents/enemies near other users with the same affiliation.

Figure 9:
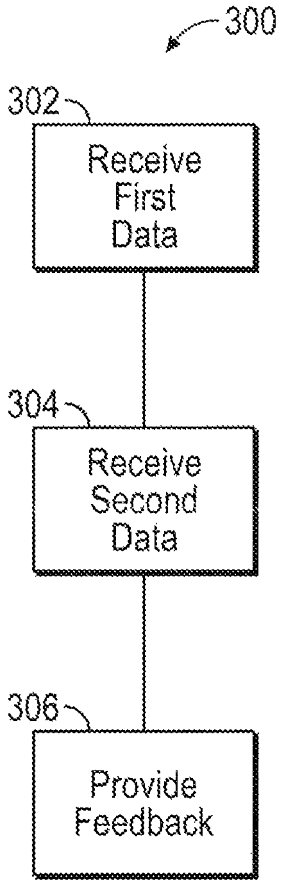
FIG. 9 is a block diagram of a method of providing feedback to a user of a haptic feedback system, according to one embodiment.

Referring now to FIG. 9, method 300 of providing feedback to a user is shown according to an example embodiment. In one example embodiment, method 300 may be implemented with electronic game feedback system 10 of FIGS. 1-5C. In another example embodiment, method 300 may be implemented with feedback system 10 of FIGS. 1 and 6-8C. Accordingly, method 300 may be described in regard to FIGS. 1-5C and/or FIGS. 1 and 6-8C.

At 302, first data is received. In one embodiment, the first data includes user data regarding a user of a primary object. In another embodiment, first data includes data regarding a primary object (e.g., a virtual character, a virtual vehicle, etc.) in a virtual environment. In an alternative embodiment, the first data may include user data regarding a user involve in a real world event (e.g., a race, an athletic event, combat, etc.). At 304, second data is received. In one embodiment, the second data includes data regarding a secondary object (e.g., another virtual character, virtual vehicle, threat object, etc.). In another embodiment, the second data includes event data. In an alternative embodiment, the second data includes data regarding an opponent (e.g., an enemy, another vehicle, other team, etc.) and/or external data. At 306, feedback is provided. In one embodiment, feedback is provided to a user of a primary object based on user data, primary object data, secondary object data, and/or event data. In an alternative embodiment, feedback is provided to a user based on user data regarding a user, user data regarding an opponent, and/or external data. The feedback may be haptic, audible, visual, combinations thereof, etc.

Figure 10:
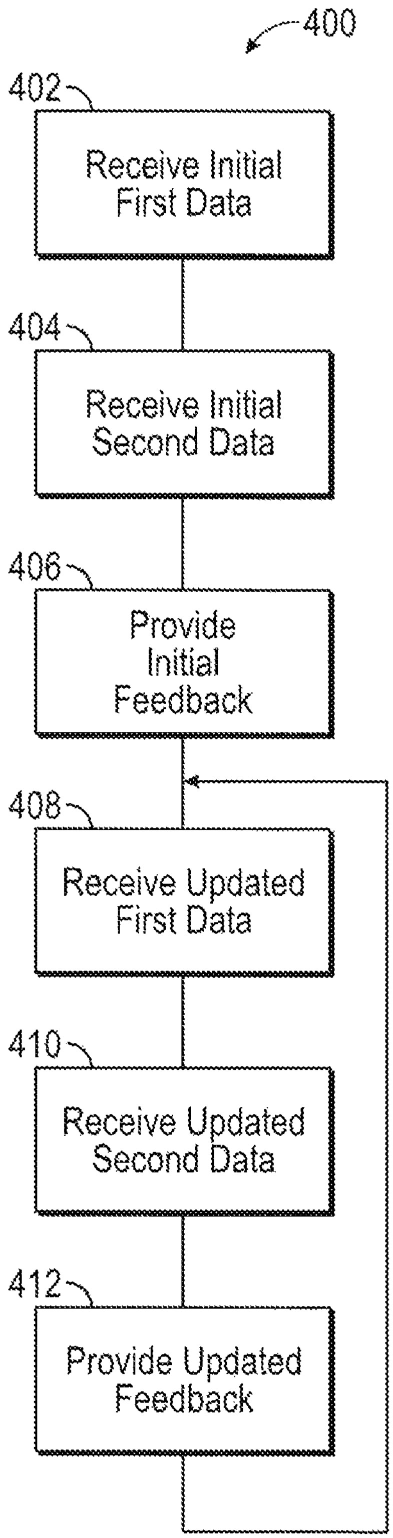
FIG. 10 is a block diagram of a method of providing continual feedback to a user of a feedback system, according to one embodiment.

Referring now to FIG. 10, method 400 of providing continual feedback to a user is shown according to an example embodiment. In one example embodiment, method 400 may be implemented with electronic game feedback system 10 of FIGS. 1-5C. In another example embodiment, method 400 may be implemented with feedback system 10 of FIGS. 1 and 6-8C. Accordingly, method 400 may be described in regard to FIGS. 1-5C and/or FIGS. 1 and 6-8C.

At 402, initial first data is received. In one embodiment, the first data includes user data regarding a user of a primary object. In another embodiment, first data includes data regarding a primary object in a virtual environment. In an alternative embodiment, the first data may include user data regarding a user involve in a real world event (e.g., a race, an athletic event, combat, etc.). At 404, initial second data is received. In one embodiment, the second data includes data regarding a secondary object (e.g., another virtual character, threat object, etc.). In another embodiment, the second data includes event data. In an alternative embodiment, the second data includes data regarding an opponent (e.g., an enemy, another vehicle, other team, etc.) and/or external data. At 406, initial feedback is provided. In one embodiment, feedback is provided to a user of a primary object based on user data, primary object data, secondary object data, and/or event data. In an alternative embodiment, feedback is provided to a user based on user data regarding a user, user data regarding an opponent, and/or external data. The feedback may be haptic, audible, visual, combinations thereof, etc.

At 408, updated first data is received. For example, the initial first data received at 402 is updated based on a new position and movement of the user and/or primary object. At 410, updated second data is received. For example, the initial second data received at 404 is updated based on a new position and movement of the secondary object or opponent, or a change in the electronic game situation (e.g., a new event, level, etc.). At 412, updated feedback is provided based on the updated first data and the updated second data. In one embodiment, 408-412 are repeated to provide continuous feedback to a user of feedback system 10. As noted elsewhere herein, the feedback may include tactile/haptic, visual, audible, or other types of feedback or combinations thereof.

Figure 11:
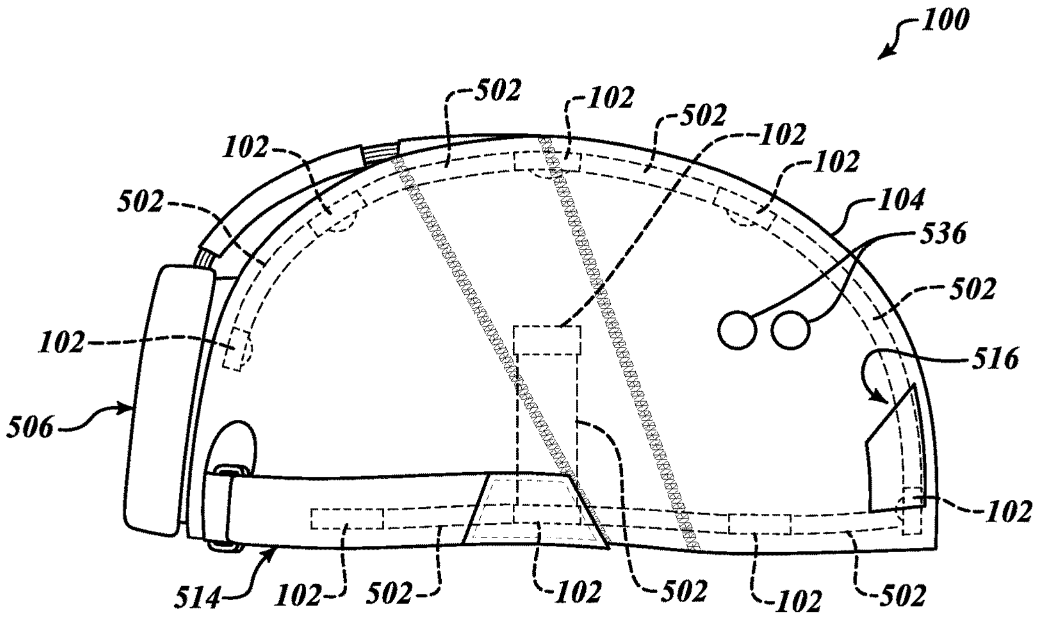
FIG. 11 is a side plan view of an illustrative wearable haptic feedback device.
Figure 13:
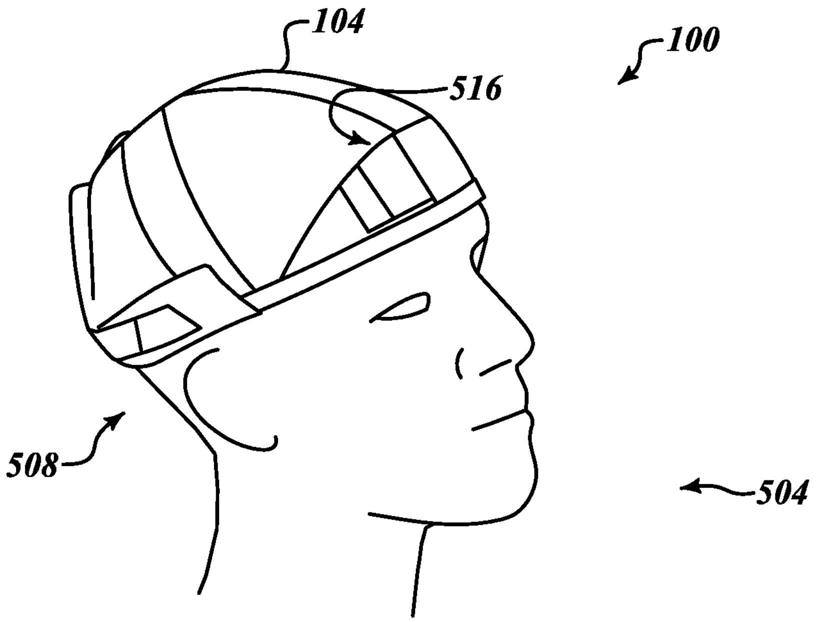
FIG. 13 is a perspective view of the illustrative wearable haptic feedback device of FIG. 11.

Referring now to FIGS. 11 and 13 and by way of overview, an illustrative wearable haptic feedback device 100 is shown. It will be appreciated that haptic feedback utilizes a user's sense of touch as an additional means of giving the user information without further burdening the user's other senses. Accordingly, embodiments of the wearable haptic feedback device 100 use a user's head's sense of touch for communication. To that end, embodiments of the wearable headgear cap 104 are embedded with haptic actuators 102 that allow for a tactile language in gaming, virtual reality, and numerous other applications. An illustrative wearable haptic feedback device 100 includes: the wearable headgear cap 104; a web 502 (shown in phantom) disposed within the cap 104; the plurality of haptic elements 102 (shown in phantom) disposed about the web 502 and configured to provide haptic feedback to a user 504 (FIG. 13); and an interface circuit 506 configured to operatively couple the plurality of haptic elements 102 to an electronic system, such as the feedback system 10 (FIG. 1). Illustrative details will be set forth below by way of non-limiting examples.

In various embodiments the wearable headgear cap 104 is made of fabric. The fabric may be selected as desired for a particular application. For example, the fabric may be chosen based upon any one or a combination of desirable properties, such as without limitation flexibility, durability, breathability, light-weight, comfort, washability, and the like.

Figure 12:
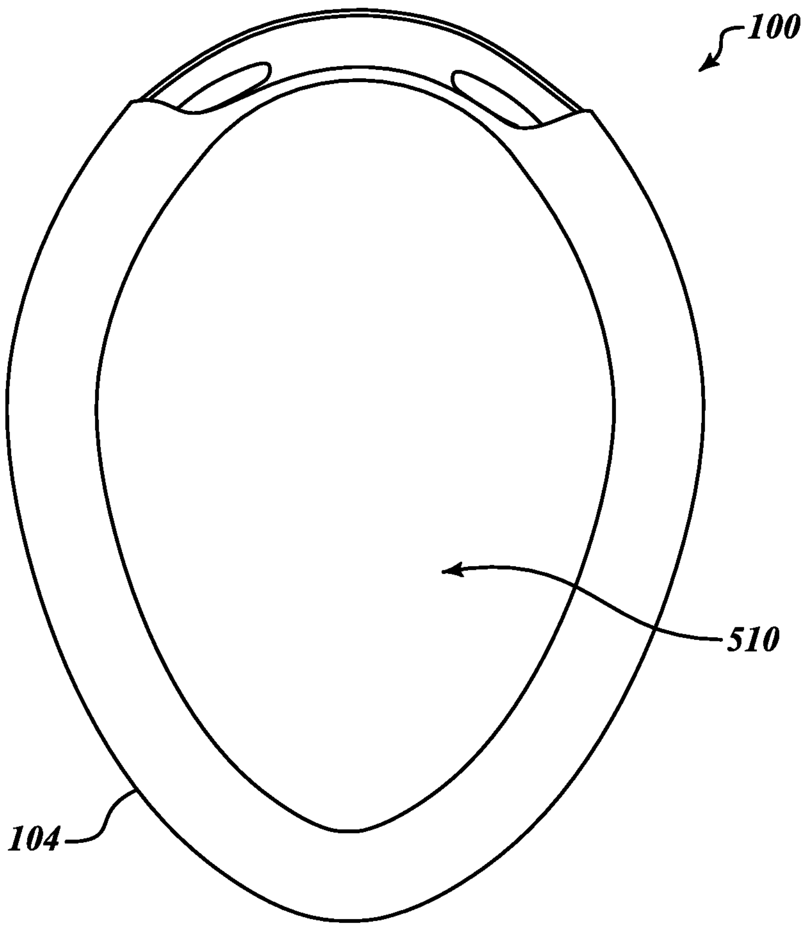
FIG. 12 is a bottom plan view of the illustrative wearable haptic feedback device of FIG. 11.

Referring additionally to FIG. 12, in some embodiments a liner 510 is removably disposable in the wearable headgear cap 104. The liner 510 may be removably attachable to the wearable headgear cap via any suitable attachment mechanism as desired for a particular application. Given by way of non-limiting examples, suitable attachment mechanisms may include hook-and-loop fasteners, hook-and-eye fasteners, snaps, one or more zippers, and the like.

Figure 14:
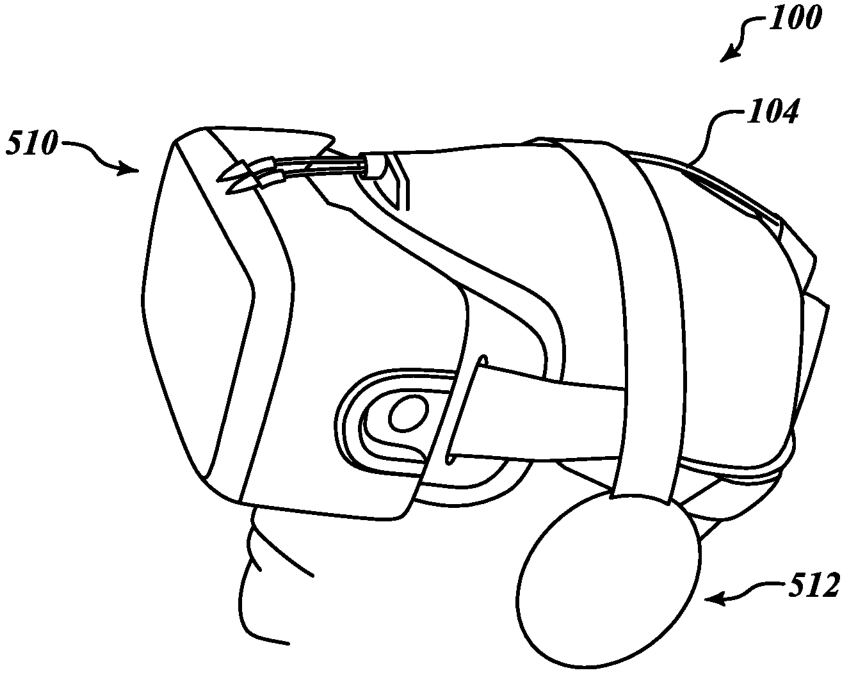
FIG. 14 is a perspective view of the illustrative wearable haptic feedback device of FIG. 11 illustrating an optional aspect thereof

Still referring to FIGS. 11-13, in various embodiments the wearable headgear cap 104 is shaped to conform to a user's head 508. In some embodiments, the wearable headgear cap 104 has a generally hemispherical shape. This construction permits the wearable headgear cap 104 to fit a variety of head shapes. This construction also helps keep the haptic elements 102 maintained in proximity to the user's head 508. Referring additionally to FIG. 14, in some embodiments the wearable headgear cap 104 is configured to accommodate thereon one or more devices such as a head-mounted display 510 and/or audio headphones 512.

Figure 15A:
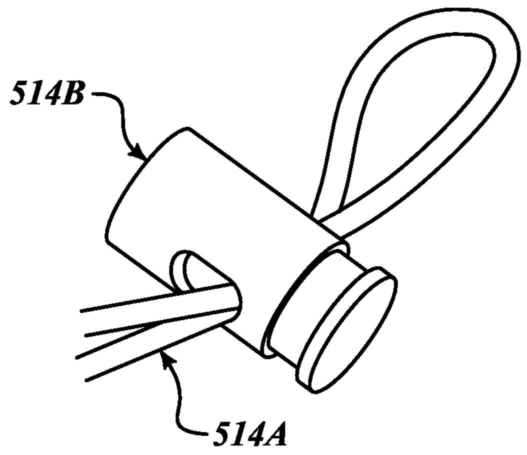
FIGS. 15A and 15B illustrate details of optional aspects of the illustrative wearable haptic feedback device of FIG. 11.
Figure 15B:
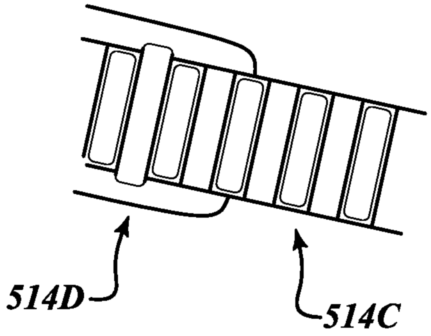

Referring now to FIGS. 11, 15A, and 15B, in various embodiments the wearable headgear cap includes a size adjustment device 514. The size adjustment device 514 permits the wearable headgear cap 104 to fit a variety of head sizes. The type of size adjustment device 514 may be selected as desired for a particular application. Given by way of non-limiting examples, the size adjustment device 514 may include hook-and-loop fasteners (FIG. 11), an elastic cord 514A (FIG. 15A) with cord lock 514B (FIG. 15A), a latex strap 514C (FIG. 15B) with adjuster mechanism 514D (FIG. 15B), and the like.

Referring now to FIGS. 11 and 13, in some embodiments a placement-assist member 516 is disposed on an external surface of the wearable headgear cap 104. The placement-assist member 516 is suitably configured to engage a finger of the user 504. The placement-assist member 516 provides the user 504 with an ability to mount and/or orient the wearable headgear cap 104 easily.

Referring now to FIGS. 11 and 16A-16C, illustrative details of a non-limiting embodiment of the web 502 will be explained by way of example only and not of limitation. A flexible structural member 518 (FIG. 16A) is shaped to conform to a head of a user and is made of a material, such as plastic, that is suitably flexible and rigid as desired. Indicia 520 mark locations where the haptic elements 102 (FIG. 16C) will be attached. Wireways 522 are cut in the structural member 518 to permit wires 524 (FIG. 16C) to run through the wireways 522 and to a side of the web 502 away from the user's head 508 (FIG. 13).

Figure 16A:
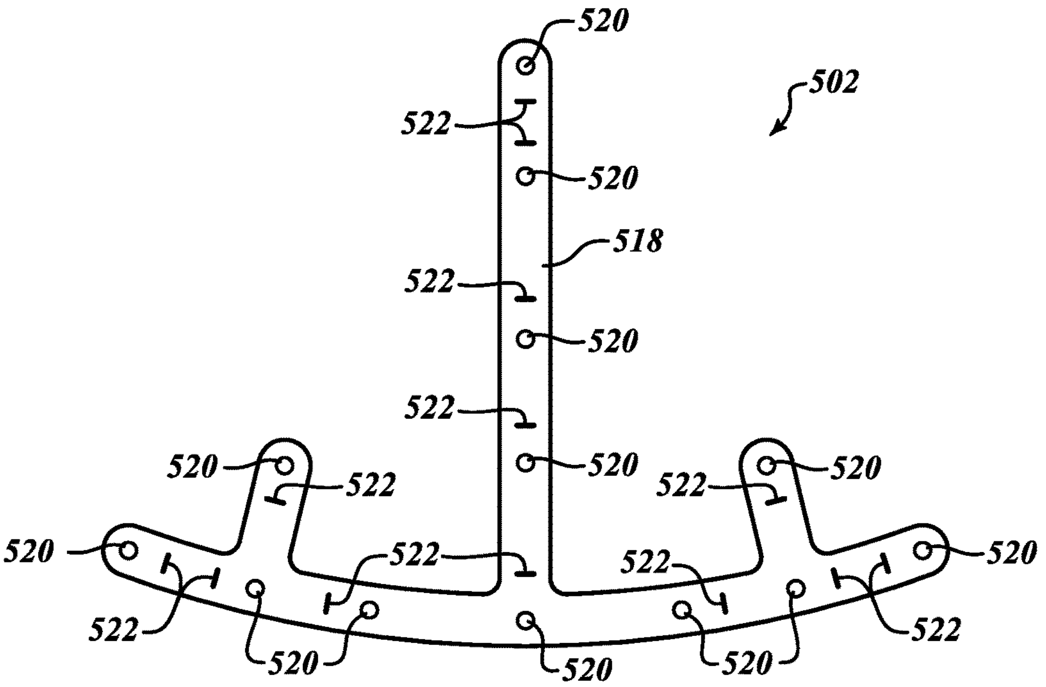
FIGS. 16A-16C illustrate details of construction of the illustrative wearable haptic feedback device of FIG. 11.
Figure 16B:
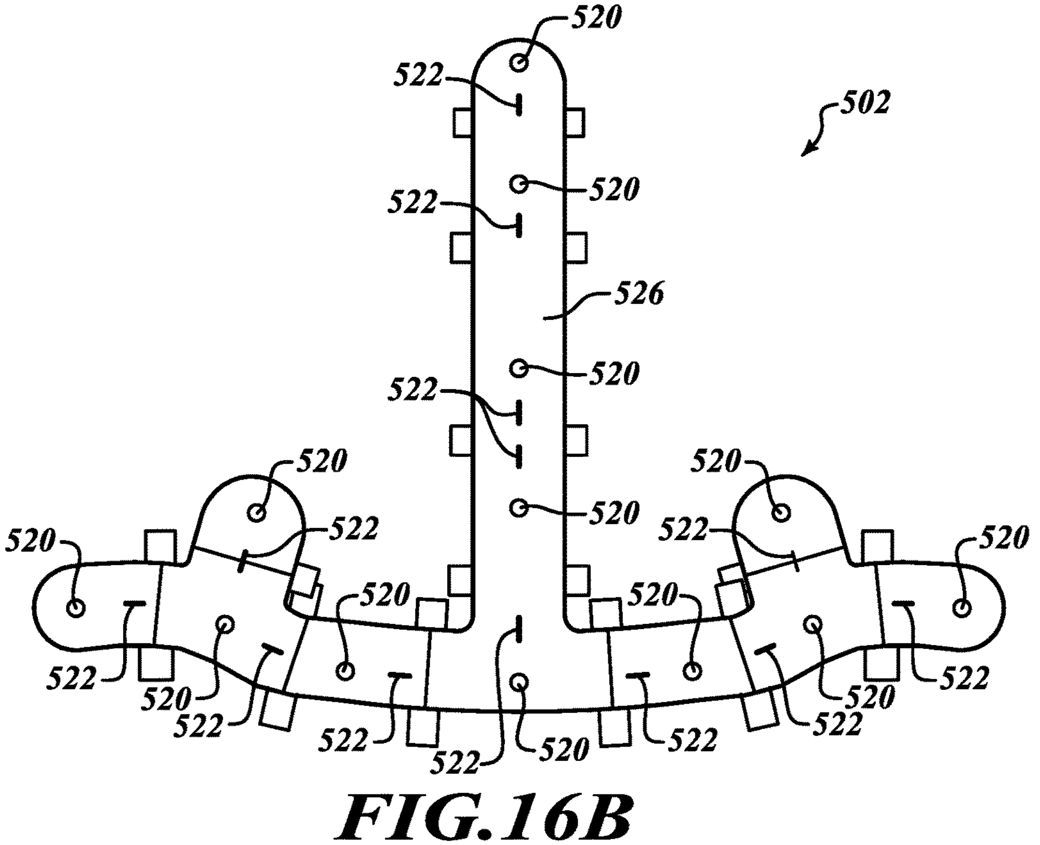
Figure 16C:
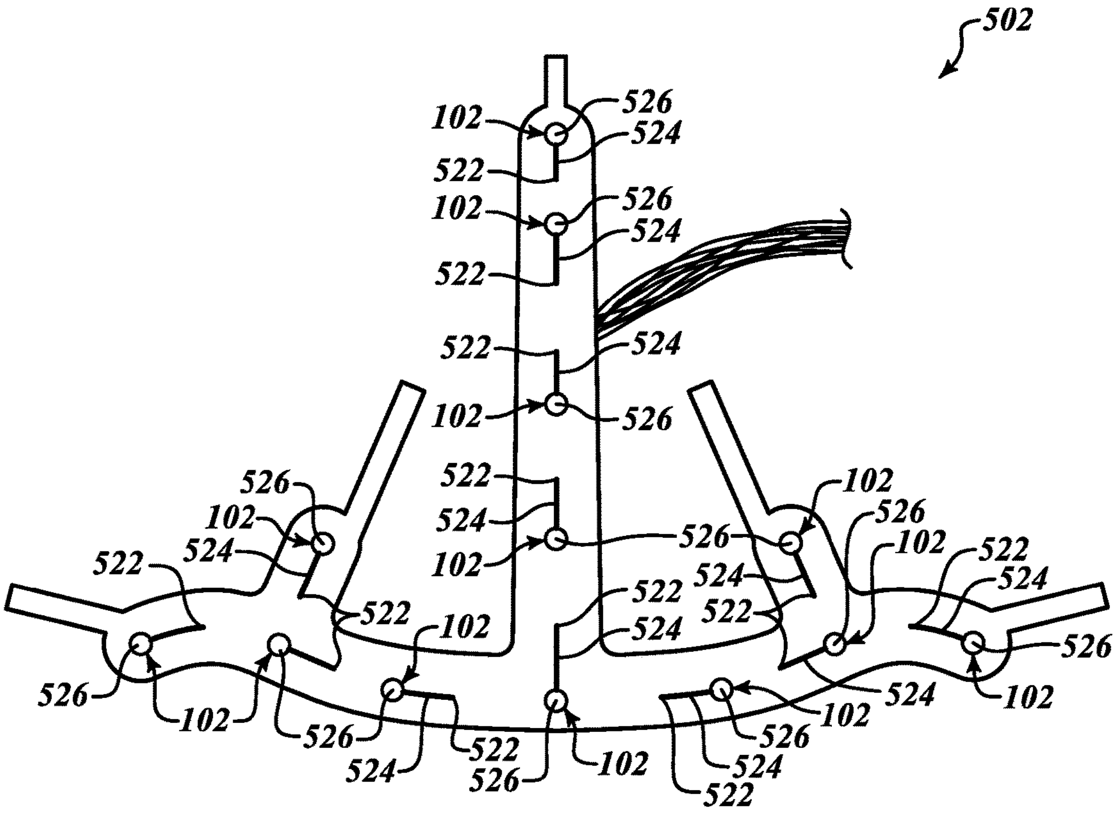

In various embodiments the web 502 includes a vibration-reducing covering 526 (FIGS. 16B and 16C). The vibration-reducing covering 526 isolates the haptic elements 102 from the fabric of the wearable headgear cap 104, thereby attenuating audio without dampening mechanical vibration of the haptic elements 102. The vibration-reducing covering 526 covers the structural member 518. In some embodiments, one or more of the haptic elements 102 include the vibration-reducing covering disposed toward a user. In various embodiments, the vibration-reducing covering 526 is made from rubber, such as by way of example and not of limitation, neoprene. The indicia 520 are also marked on the vibration-reducing covering 526, and the wireways 522 are also cut into the vibration-reducing covering 526.

The web 502 is disposed in the wearable headgear cap 104 as desired. In some embodiments the web 502 may be fixedly attached to the interior of the wearable headgear cap 104, such as by sewing, with adhesives, or the like. In some other embodiments, the web 502 may be removably disposable within the wearable headgear cap 104, such as via hook-and-loop fasteners, hook-and-eye fasteners, snaps, one or more zippers, and the like.

The haptic elements 102 are suitably attached to the web 502 at locations indicated by the indicia 520. For example, the haptic elements 102 may be attached to the structural member 518 with a suitable adhesive. While thirteen (13) haptic elements 102 are shown by way of illustration and not of limitation, it will be appreciated that any number of haptic elements 102 may be used as desired for a particular application. In various embodiments, the haptic elements 102 may be any actuator as desired for a particular application, such as without limitation a vibrator, a tapper, an air puffer, an eccentric rotating mass, a linear resonant actuator, a pneumatic actuator, a piezoelectric actuator, and the like.

Figure 17:
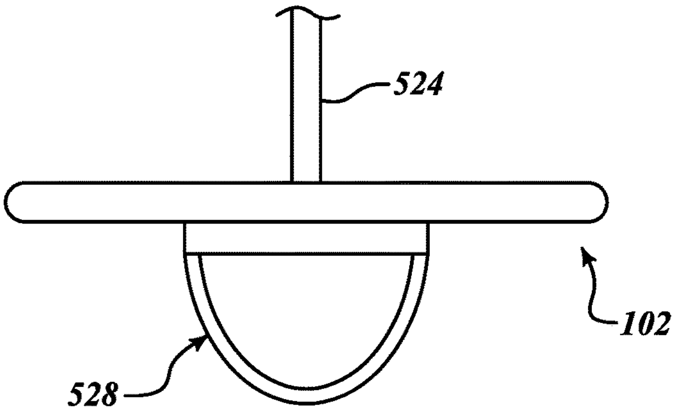
FIG. 17 is a side plan view in partial schematic form of an optional aspect of the illustrative wearable haptic feedback device of FIG. 11.

Referring now to FIG. 17, in some embodiments at least one of the haptic elements 102 may include a tip 528 disposed toward a user. The tip 528 is configured to increase conductivity of mechanical energy from the haptic element 102 to a user. Given by way of non-limiting example, the tip 528 may be made from silicone.

Figure 18A:
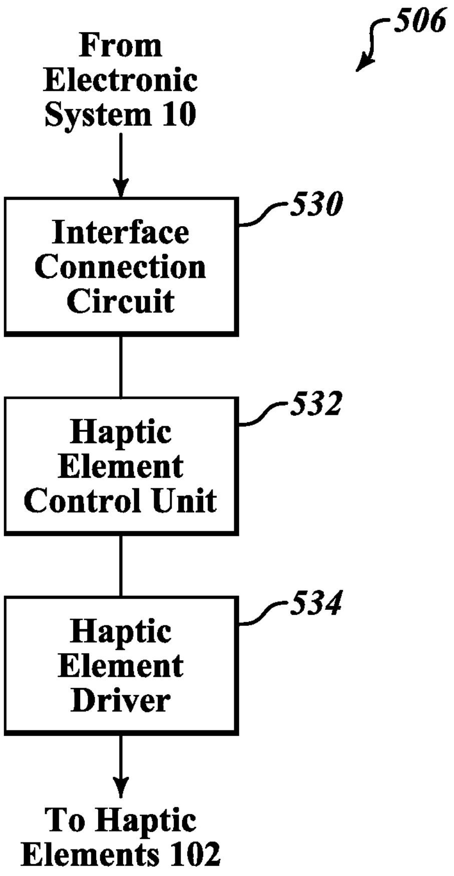
FIG. 18A is a block diagram of an illustrative interface circuit.

Referring now to FIGS. 11 and 18A, the interface circuit 506 includes an interface connection circuit 530 that is operatively couplable to the electronic system 10. In some embodiments the interface connection circuit 530 is configured to be operatively coupled to the electronic system 10 via a wired electrical connection. For example, the interface connection circuit 530 may be hard-wired to the electronic system 10. As another example, the interface connection circuit 530 may include a jack or a port, such as a USB port, into which suitable electrical cabling may be inserted to operatively couple the interface connection circuit 530 and the electronic system 10. In some other embodiments the interface connection circuit 530 is configured to be operatively coupled to the electronic system 10 via a wireless connection. For example, the interface connection circuit 530 may include a suitable receiver that is configured to be operatively coupled to the electronic system 10 via an optical connection, an infrared connection, a radiofrequency connection, a WiFi connection, or a Bluetooth connection.

A haptic element control unit 532 is operatively coupled to the interface connection circuit 530. The haptic element control unit 532 is any suitable electronic controller configured to receive and process output from the electronic system 10 (via the interface connection circuit 530) and generate signals accordingly for each of the haptic elements 102 to be actuated.

Haptic element drivers 534 are operatively coupled between the haptic element control unit 532 and the haptic elements 102 (that is, each haptic element 102 is operatively coupled to its own associated haptic element driver 534). The haptic element drivers 534 are suitable drivers that receive output from the haptic element control unit 532 and generate electronic signals suitable for driving the haptic elements 102.

In some embodiments, the interface circuit 506 may be embodied as a flex circuit. In various embodiments, the interface circuit 506 may include hardware, software, and/or firmware.

In some embodiments, the interface circuit 506 may be configured to adjust an amount of vibration of selected haptic elements 102 based upon location of the haptic element in relation to a head of a user. Given by way of non-limiting example, a user may generate a command via the electronic system 10 to adjust an amount of vibration of selected haptic elements 102 based upon location of the haptic element in relation to the user's head. The command is received by the interface connection circuit 530. The haptic element control unit 532 receives the command from the interface connection circuit 530 and performs appropriate signal processing to generate signals that reflect the vibration adjustment when the selected haptic element 102 is to be actuated. In some embodiments, the interface circuit 506 may be configured to increase an amount of vibration of one or more of the haptic elements 102 based upon location of the haptic element in relation to a head of a user as desired, such as without limitation a location proximate a user's ear. In some embodiments, the interface circuit 506 may be configured to decrease an amount of vibration of one or more of the haptic elements 102 based upon location of the haptic element in relation to a head of a user as desired, such as without limitation a location proximate a top of a user's head.

Figure 18B:
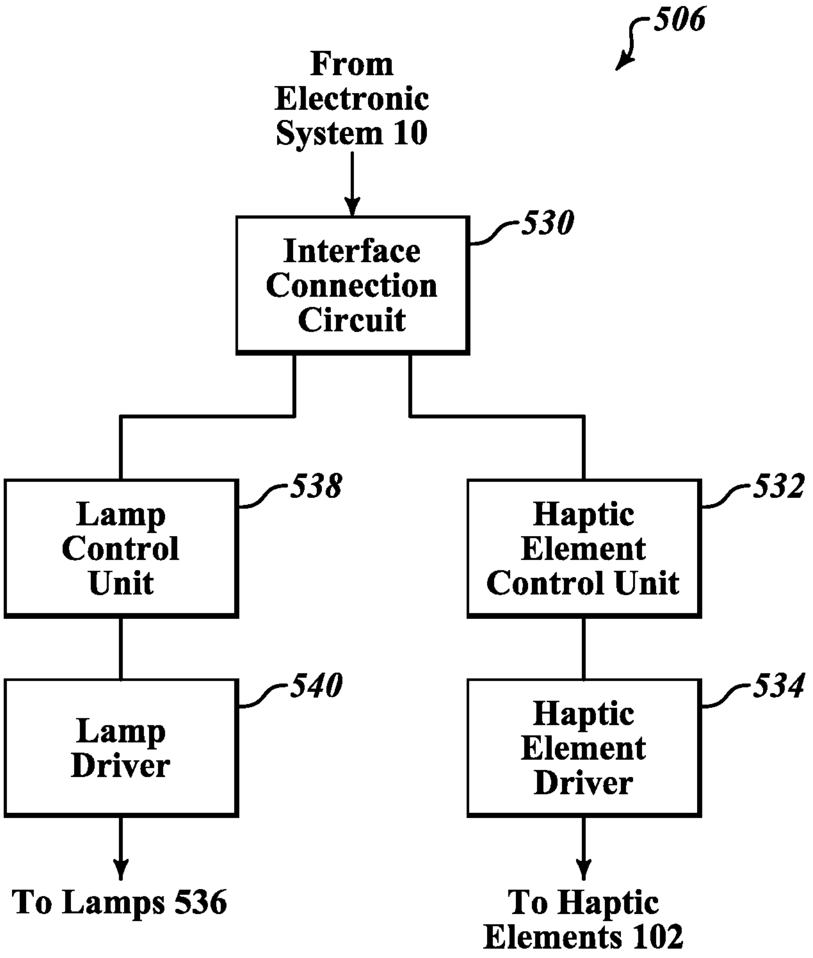
FIG. 18B is a block diagram of another illustrative interface circuit.

Referring now to FIGS. 11 and 18B, in some embodiments at least one light 536 may be disposed on an external surface of the wearable headgear cap 104 and operatively coupled to the interface circuit 506. Any number of lights 536 may be provided as desired. The lights 536 may indicate any information as desired or maybe purely cosmetic. For example, a color of a lit light 536 may indicate a team with which a user is associated (such as a red team, a blue team, or the like). As further examples, on-or-off condition or color of a light 536 may indicate condition of a user, whether the electronic system 10 is on or off, which haptic element 102 is actuated, or the like. A lamp control unit 538 is operatively coupled to the interface connection circuit 530. The lamp control unit 538 is any suitable electronic controller configured to receive and process output from the electronic system 10 (via the interface connection circuit 530) and generate signals accordingly for each of the lights 536 to be actuated. In some embodiments, the lamp control unit 538 may be a separate component from the haptic element control unit 532. In some other embodiments, the lamp control unit 538 may be implemented by the haptic element control unit 532. Lamp drivers 540 are operatively coupled between the lamp control unit 538 and the lights 536 (that is, each light 536 is operatively coupled to its own associated lamp driver 540). The lamp drivers 540 are suitable drivers that receive output from the lamp control unit 538 and generate electronic signals suitable for driving the lights 536.

Figure 19A:
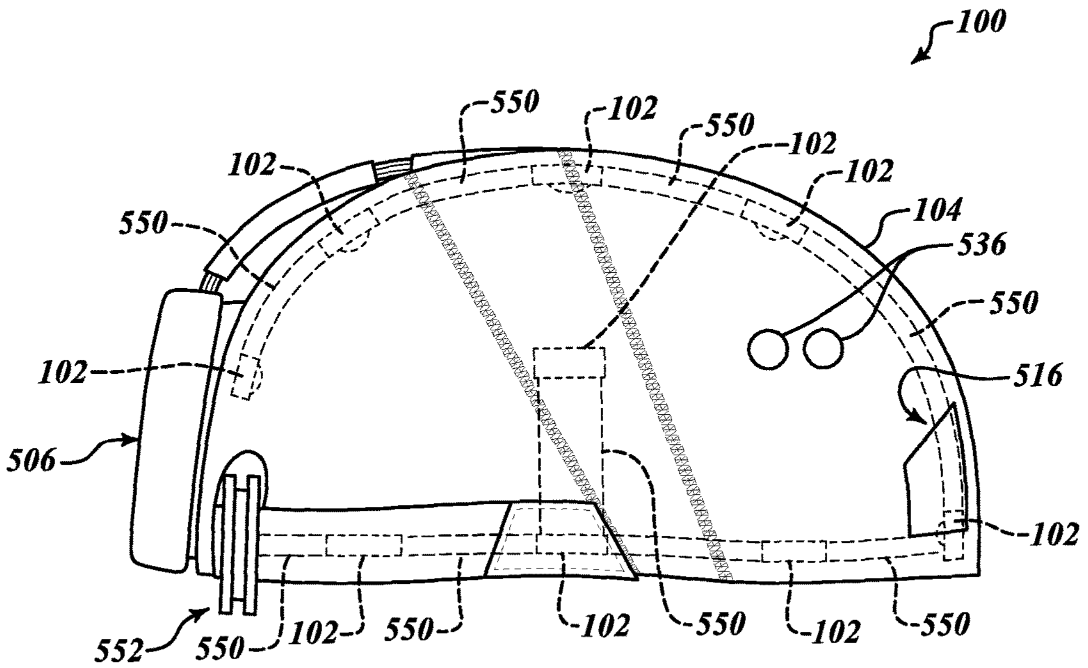
FIG. 19A is a side plan view of another illustrative wearable haptic feedback device.
Figure 19B:
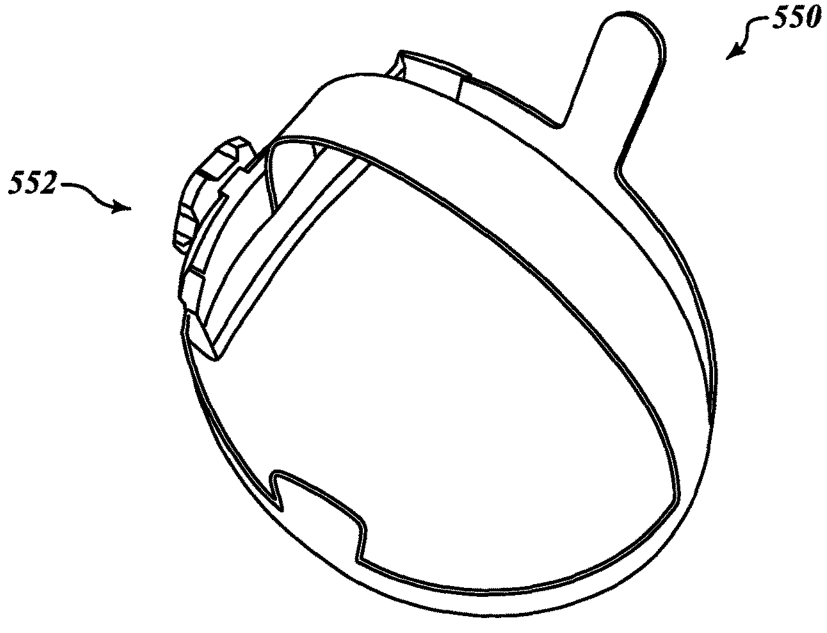
FIG. 19B is a perspective view illustrating details of construction of an aspect of the illustrative wearable haptic feedback device of FIG. 19A.

Referring now to FIGS. 19A and 19B, in another illustrative embodiment the wearable haptic feedback device 100 includes: the wearable headgear cap 104 shaped to conform to a user's head; a frame 550 disposed within the cap 104, the frame 550 including a size adjustment device 552; the plurality of haptic elements 102 (shown in phantom) disposed about the frame 550 and configured to provide haptic feedback to the user 504 (FIG. 13); and the interface circuit 506 configured to operatively couple the plurality of haptic elements 102 to the electronic system 10 (FIG. 1). In some embodiments the size adjustment device 552 may include a ratchet mechanism. Other aspects of the wearable haptic feedback device shown in FIG. 19A have been described above, and repetition of their construction and operation are not necessary for understanding by a person of skill in the art.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 20A:
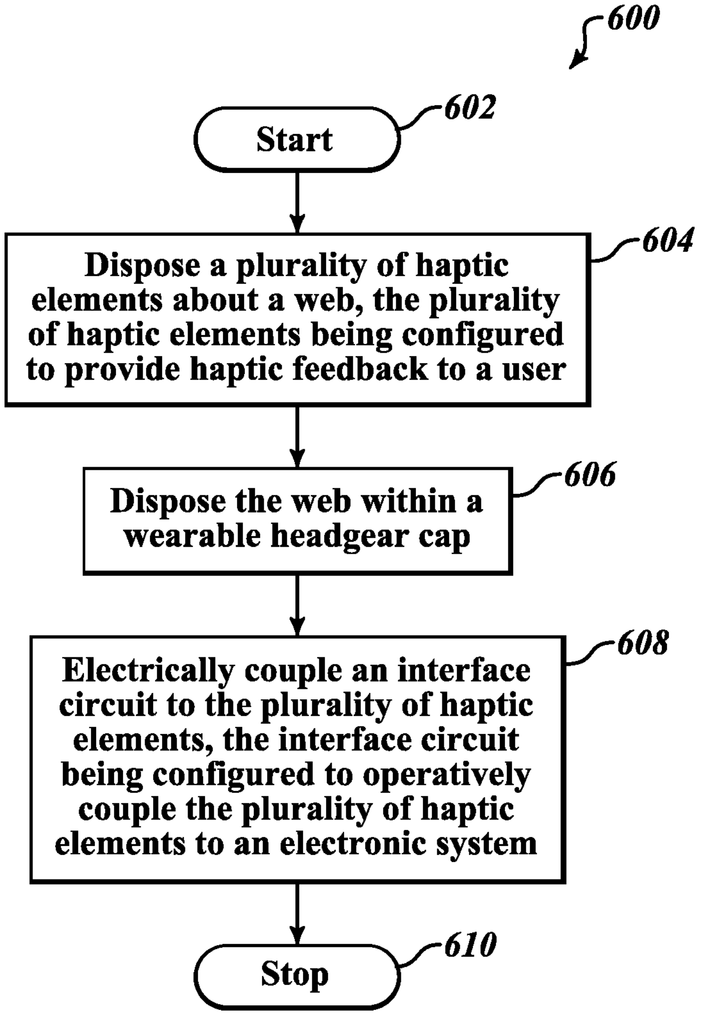
FIG. 20A is a flowchart of an illustrative method of fabricating a wearable haptic feedback device.

Referring now to FIG. 20A, an illustrative method 600 is provided for fabricating a wearable haptic feedback device. The method 600 starts at a block 602. At a block 604 a plurality of haptic elements are disposed about a web, the plurality of haptic elements being configured to provide haptic feedback to a user. At a block 606 the web is disposed within a wearable headgear cap. At a block 608 an interface circuit is electrically coupled to the plurality of haptic elements, the interface circuit being configured to operatively couple the plurality of haptic elements to an electronic system. The method 600 stops at a block 610.

Figure 20B:
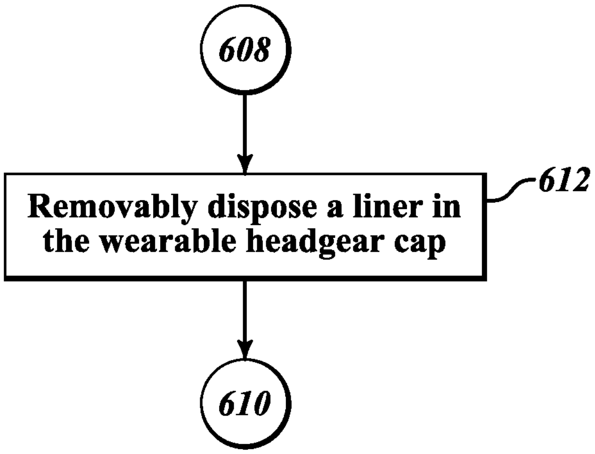
FIGS. 20B-20N are flowcharts of details of the method of FIG. 20A.

Referring now to FIG. 20B, in some embodiments a liner may be removably disposed in the wearable headgear cap at a block 612.

Figure 20C:
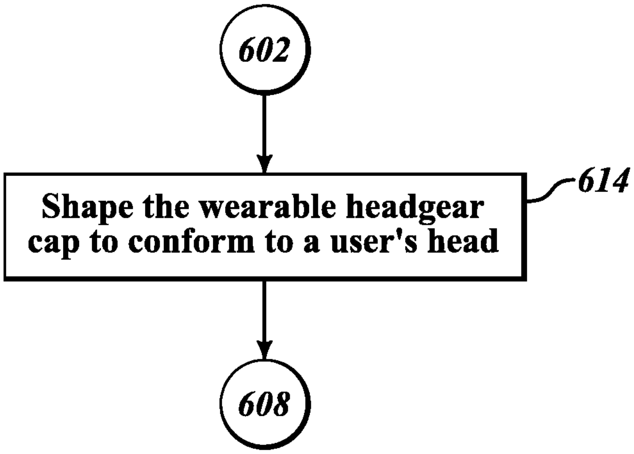

Referring now to FIG. 20C, in some embodiments the wearable headgear cap may be shaped to conform to a user's head at a block 614.

Figure 20D:
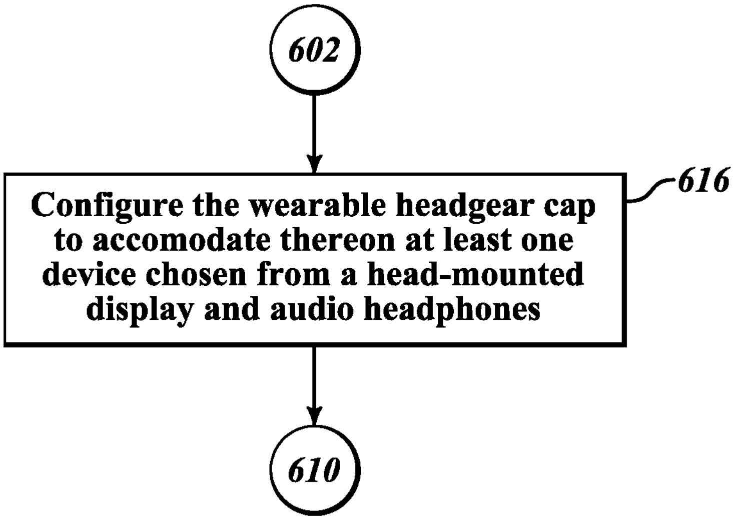

Referring now to FIG. 20D, in some embodiments the wearable headgear cap may be configured to accommodate thereon at least one device chosen from a head-mounted display and audio headphones at a block 616.

Figure 20E:
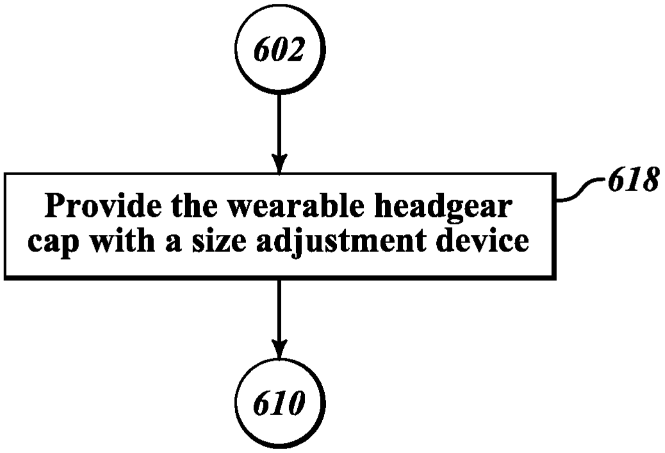

Referring now to FIG. 20E, in some embodiments the wearable headgear cap may be provided with a size adjustment device at a block 618.

Figure 20F:
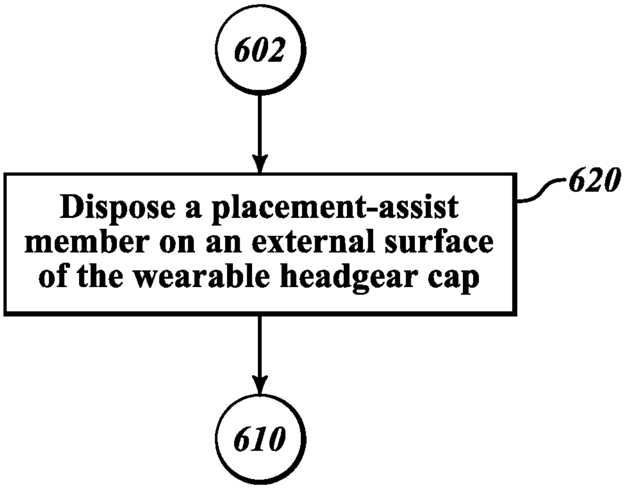

Referring now to FIG. 20F, in some embodiments a placement-assist member may be disposed on an external surface of the wearable headgear cap at a block 620.

Figure 20G:
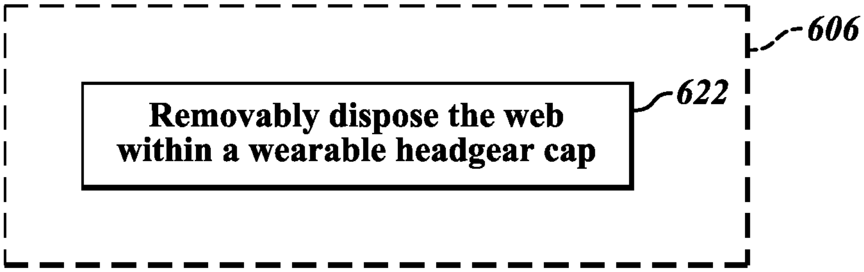

Referring now to FIG. 20G, in some embodiments disposing the web within a wearable headgear cap at the block 606 may include removably disposing the web within a wearable headgear cap at a block 622.

Figure 20H:
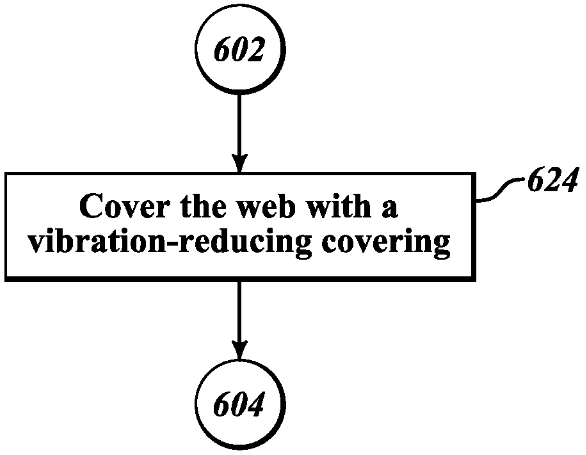

Referring now to FIG. 20H, in some embodiments the web may be covered with a vibration-reducing covering at a block 624.

Figure 20I:
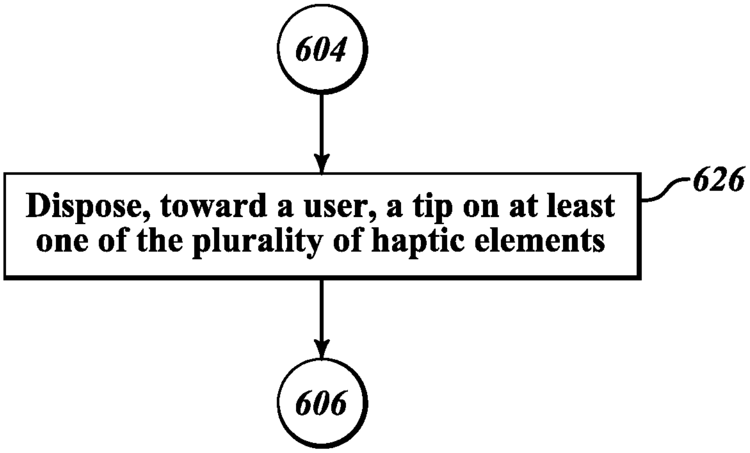

Referring now to FIG. 20I, in some embodiments a tip may be disposed toward a user on at least one of the plurality of haptic elements at a block 626.

Figure 20J:
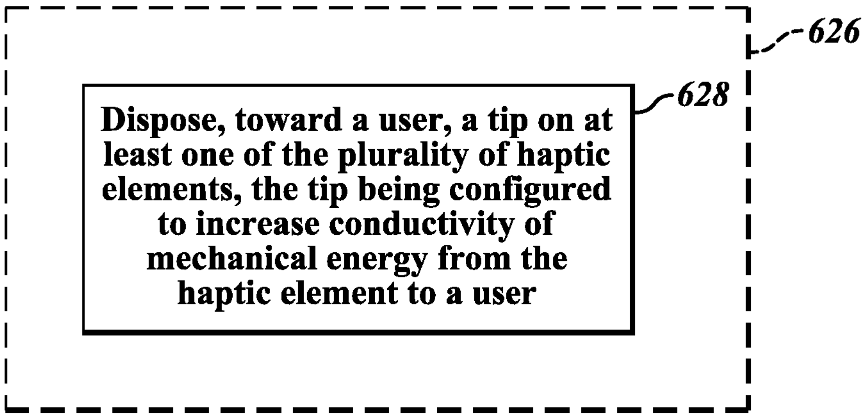

Referring now to FIG. 20J, in some embodiments disposing, toward a user, a tip on at least one of the plurality of haptic elements at the block 626 may include disposing, toward a user, a tip on at least one of the plurality of haptic elements, the tip being configured to increase conductivity of mechanical energy from the haptic element to a user at a block 628.

Figure 20K:
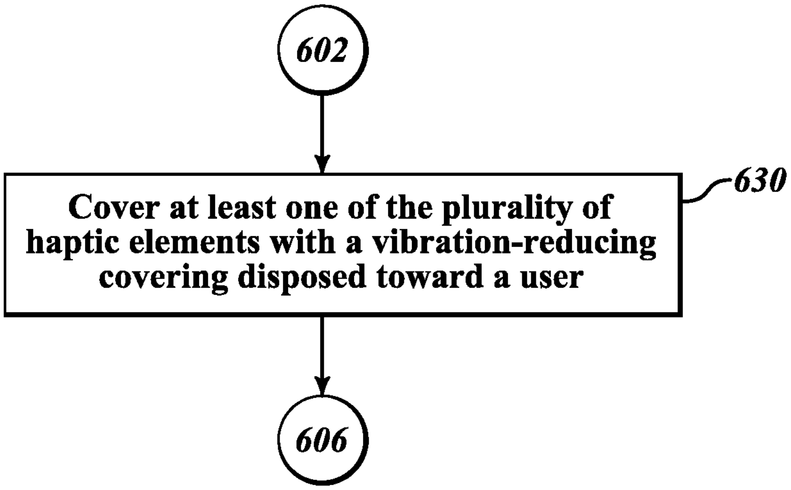

Referring now to FIG. 20K, in some embodiments at least one of the plurality of haptic elements may be covered with a vibration-reducing covering disposed toward a user at a block 630.

Figure 20L:
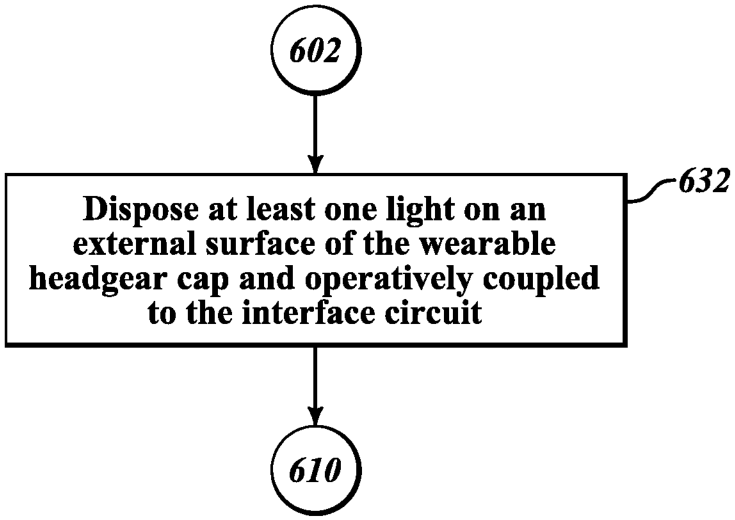

Referring now to FIG. 20L, in some embodiments at least one light may be disposed on an external surface of the wearable headgear cap and operatively coupled to the interface circuit at a block 632.

Figure 20M:
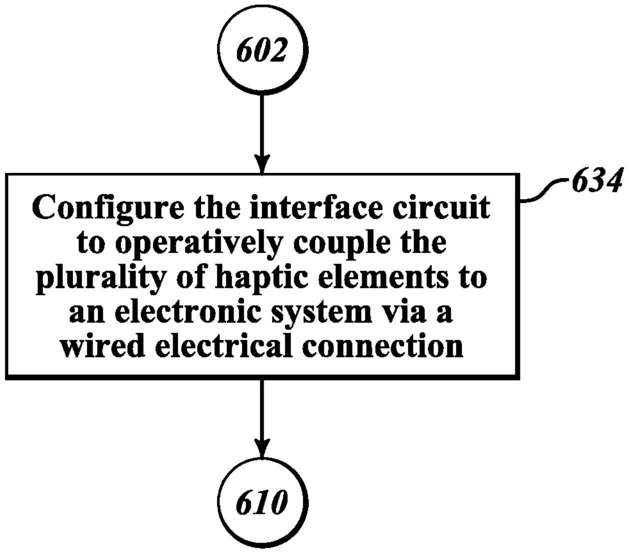

Referring now to FIG. 20M, in some embodiments the interface circuit may be configured to operatively couple the plurality of haptic elements to an electronic system via a wired electrical connection at a block 634.

Figure 20N:
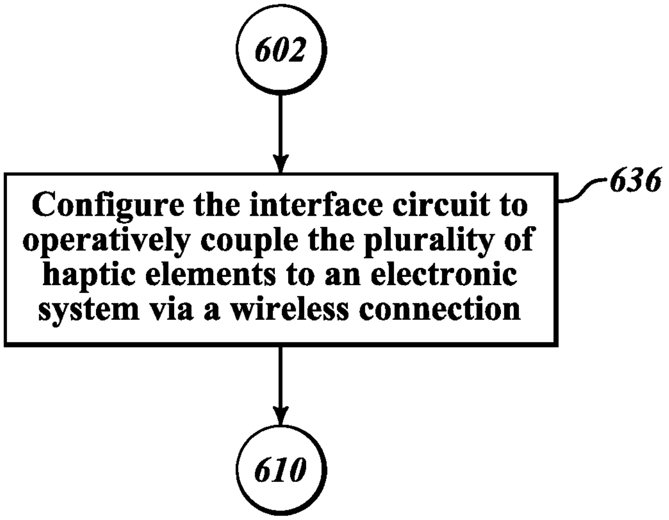

Referring now to FIG. 20N, in some embodiments the interface circuit may be configured to operatively couple the plurality of haptic elements to an electronic system via a wireless connection at a block 636.

Figure 21A:
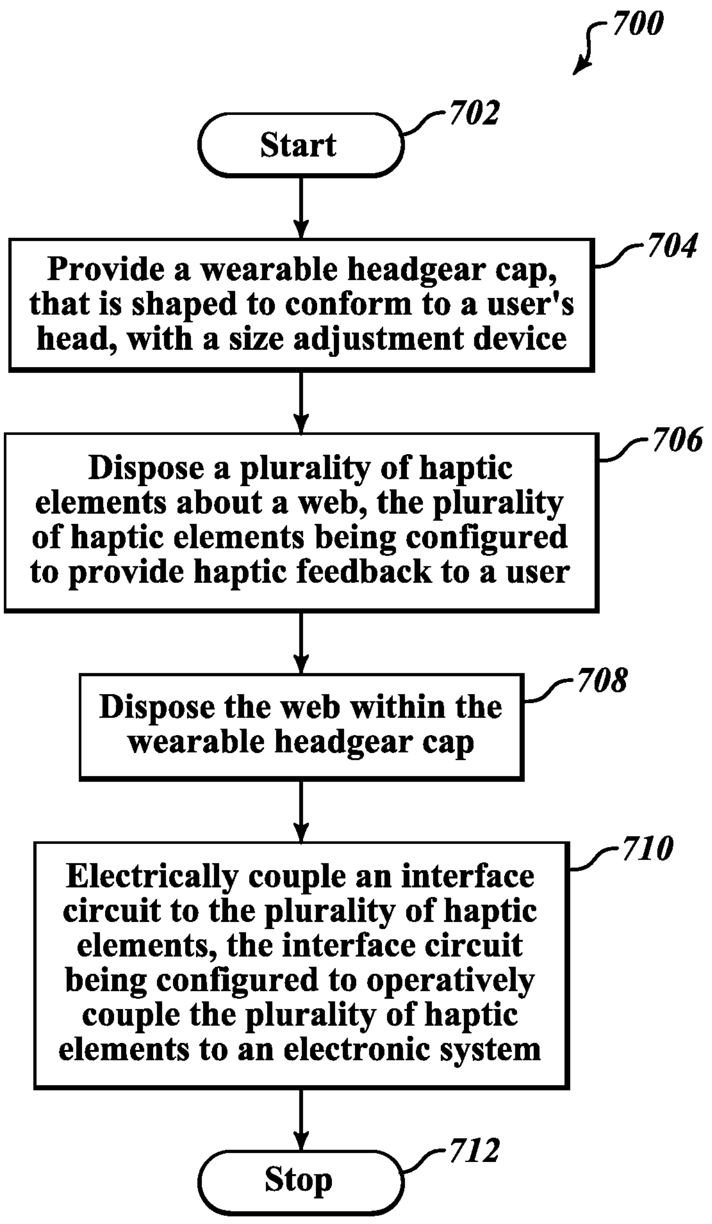
FIG. 21A is a flowchart of another illustrative method of fabricating a wearable haptic feedback device.

Referring now to FIG. 21A, an illustrative method 700 is provided for fabricating a wearable haptic feedback device. The method 700 starts at a block 702. At a block 704 a wearable headgear cap, that is shaped to conform to a user's head, is provided with a size adjustment device. At a block 706 a plurality of haptic elements are disposed about a web, the plurality of haptic elements being configured to provide haptic feedback to a user. At a block 708 the web is disposed within the wearable headgear cap. At a block 710 an interface circuit is electrically coupled to the plurality of haptic elements, the interface circuit being configured to operatively couple the plurality of haptic elements to an electronic system. The method 700 stops at a block 712.

Figure 21B:
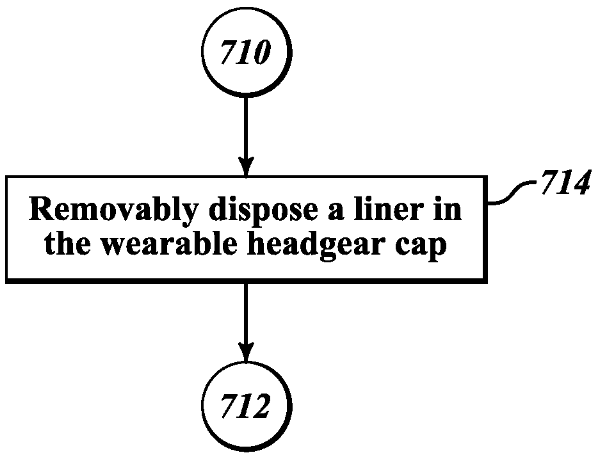
FIGS. 21B-21L are flowcharts of details of the method of FIG. 21A.

Referring now to FIG. 21B, in some embodiments a liner may be removably disposed in the wearable headgear cap at a block 714.

Figure 21C:
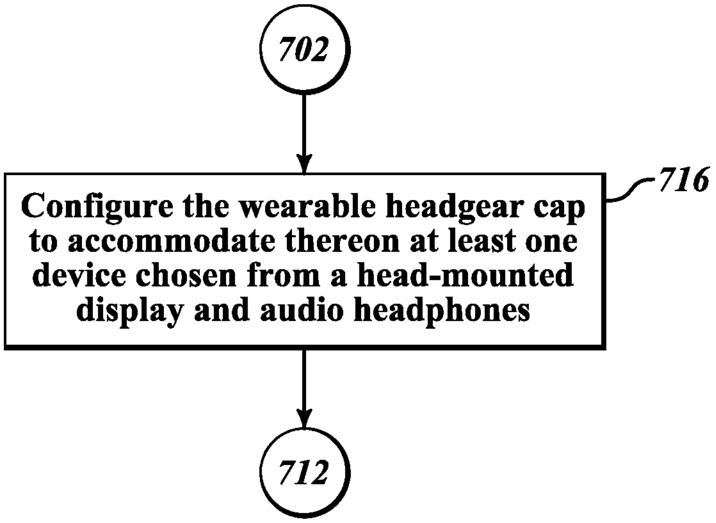

Referring now to FIG. 21C, in some embodiments the wearable headgear cap may be configured to accommodate thereon at least one device chosen from a head-mounted display and audio headphones at a block 716.

Figure 21D:
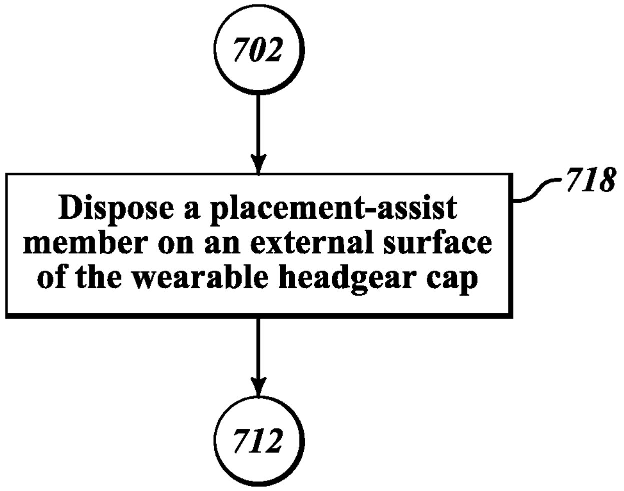

Referring now to FIG. 21D, in some embodiments a placement-assist member may be disposed on an external surface of the wearable headgear cap at a block 718.

Figure 21E:
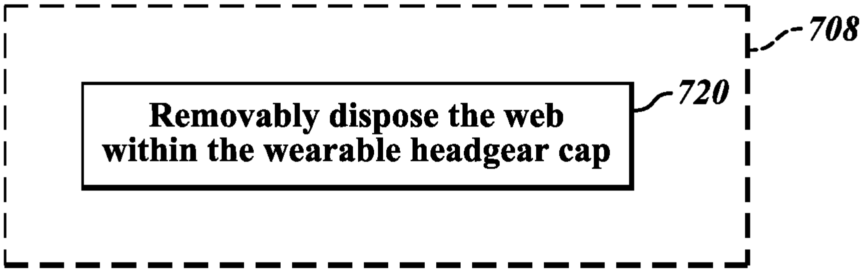

Referring now to FIG. 21E, in some embodiments disposing the web within a wearable headgear cap at the block 708 may include removably disposing the web within a wearable headgear cap at a block 720.

Figure 21F:
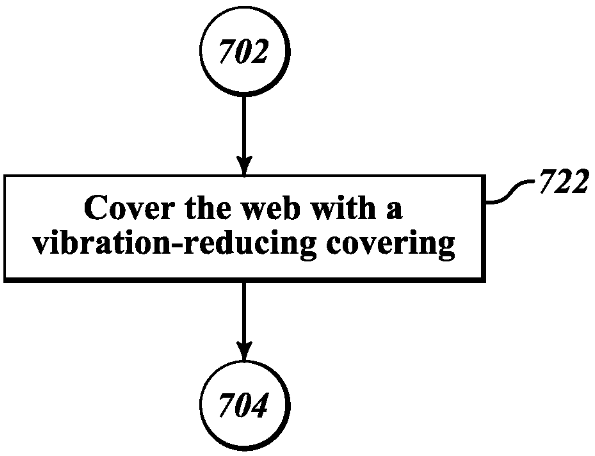

Referring now to FIG. 21F, in some embodiments the web may be covered with a vibration-reducing covering at a block 722.

Figure 21G:
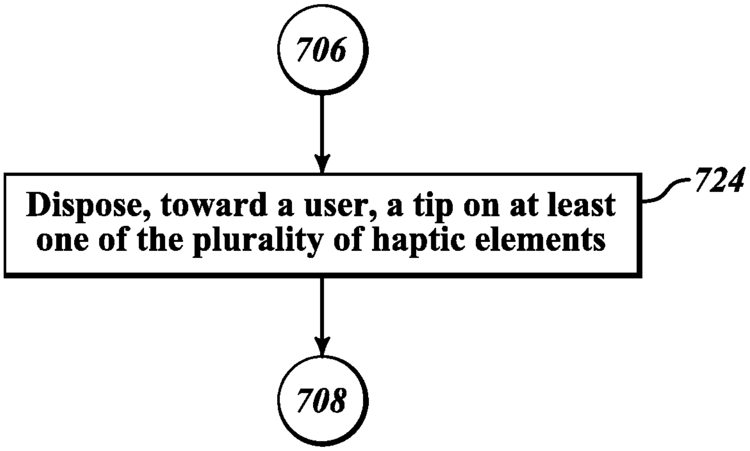

Referring now to FIG. 21G, in some embodiments a tip may be disposed toward a user on at least one of the plurality of haptic elements at a block 724.

Figure 21H:
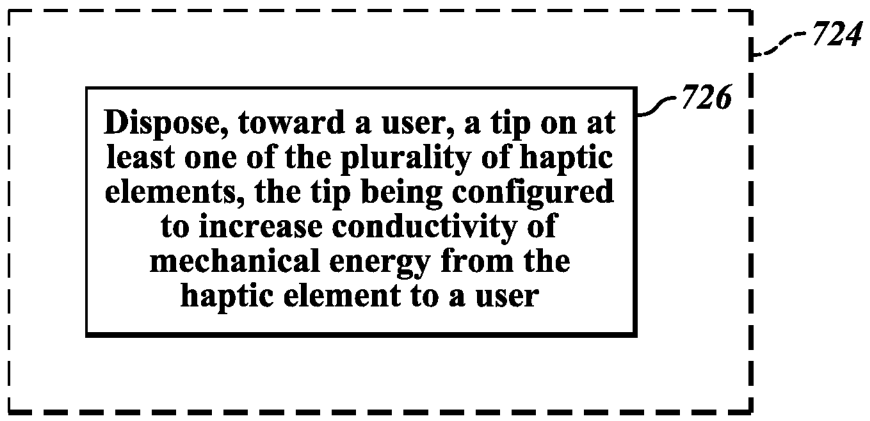

Referring now to FIG. 21H, in some embodiments disposing, toward a user, a tip on at least one of the plurality of haptic elements at the block 724 may include disposing, toward a user, a tip on at least one of the plurality of haptic elements, the tip being configured to increase conductivity of mechanical energy from the haptic element to a user at a block 726.

Figure 21I:
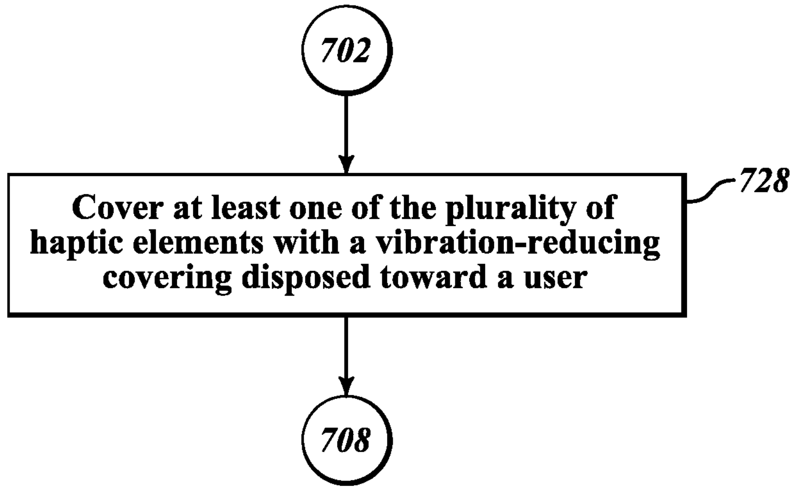

Referring now to FIG. 21I, in some embodiments at least one of the plurality of haptic elements may be covered with a vibration-reducing covering disposed toward a user at a block 728.

Figure 21J:
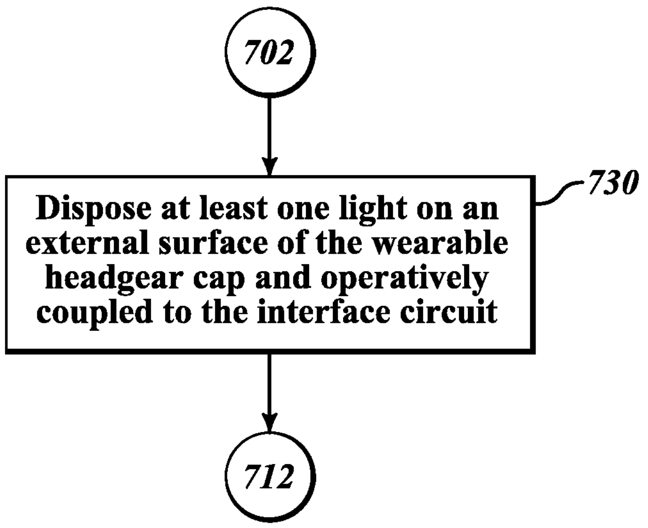

Referring now to FIG. 21J, in some embodiments at least one light may be disposed on an external surface of the wearable headgear cap and operatively coupled to the interface circuit at a block 730.

Figure 21K:
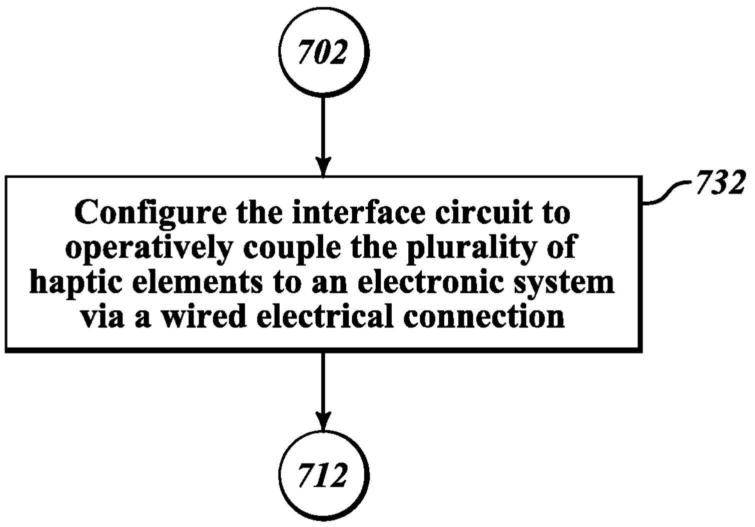

Referring now to FIG. 21K, in some embodiments the interface circuit may be configured to operatively couple the plurality of haptic elements to an electronic system via a wired electrical connection at a block 732.

Figure 21L:
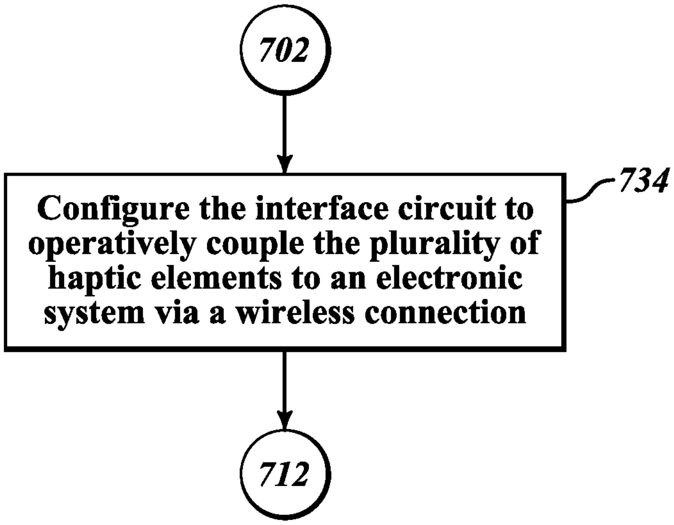

Referring now to FIG. 21L, in some embodiments the interface circuit may be configured to operatively couple the plurality of haptic elements to an electronic system via a wireless connection at a block 734.

Figure 22A:
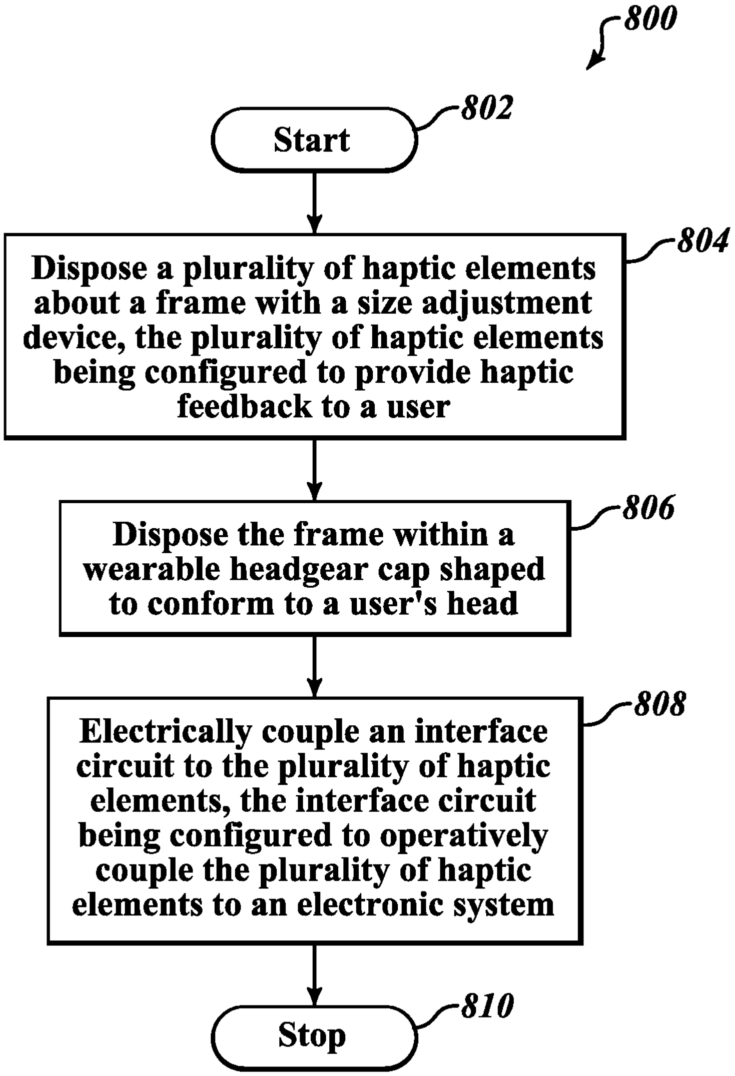
FIG. 22A is a flowchart of another illustrative method of fabricating a wearable haptic feedback device.

Referring now to FIG. 22A, an illustrative method 800 is provided for fabricating a wearable haptic feedback device. The method 800 starts at a block 802. At a block 804 a plurality of haptic elements are disposed about a frame with a size adjustment device, the plurality of haptic elements being configured to provide haptic feedback to a user. At a block 806 the web is disposed within a wearable headgear cap shaped to conform to a user's head. At a block 808 an interface circuit is electrically coupled to the plurality of haptic elements, the interface circuit being configured to operatively couple the plurality of haptic elements to an electronic system. The method 800 stops at a block 810.

Figure 22B:
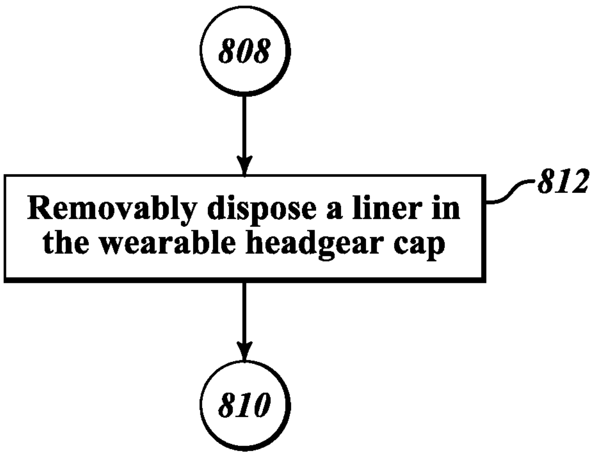
FIGS. 22B-22L are flowcharts of details of the method of FIG. 22A.

Referring now to FIG. 22B, in some embodiments a liner may be removably disposed in the wearable headgear cap at a block 812.

Figure 22C:
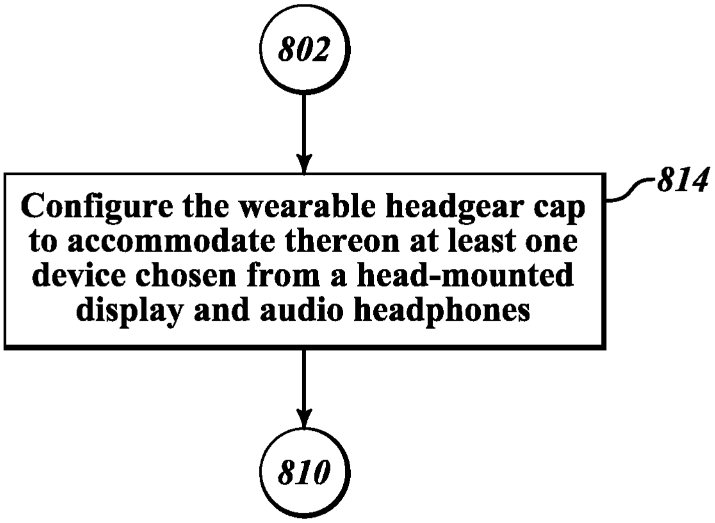

Referring now to FIG. 22C, in some embodiments the wearable headgear cap may be configured to accommodate thereon at least one device chosen from a head-mounted display and audio headphones at a block 814.

Figure 22D:
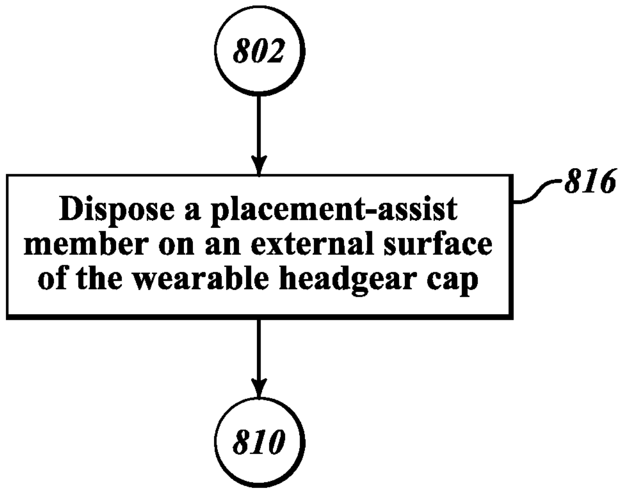

Referring now to FIG. 22D, in some embodiments a placement-assist member may be disposed on an external surface of the wearable headgear cap at a block 816.

Figure 22E:
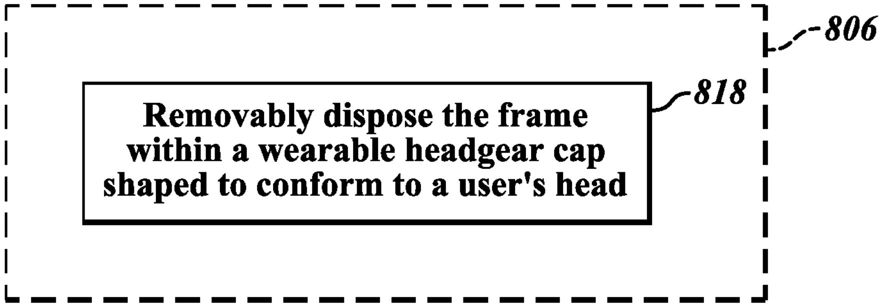

Referring now to FIG. 22E, in some embodiments disposing the frame within a wearable headgear cap shaped to conform to a user's head at the block 806 may include removably disposing the frame within a wearable headgear cap shaped to conform to a user's head at a block 818.

Figure 22F:
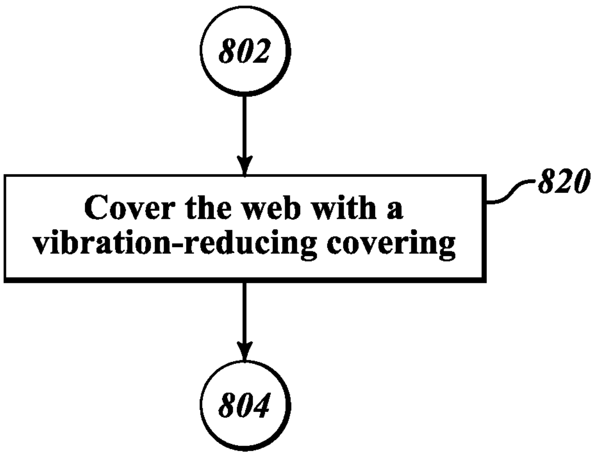

Referring now to FIG. 22F, in some embodiments the web may be covered with a vibration-reducing covering at a block 820.

Figure 22G:
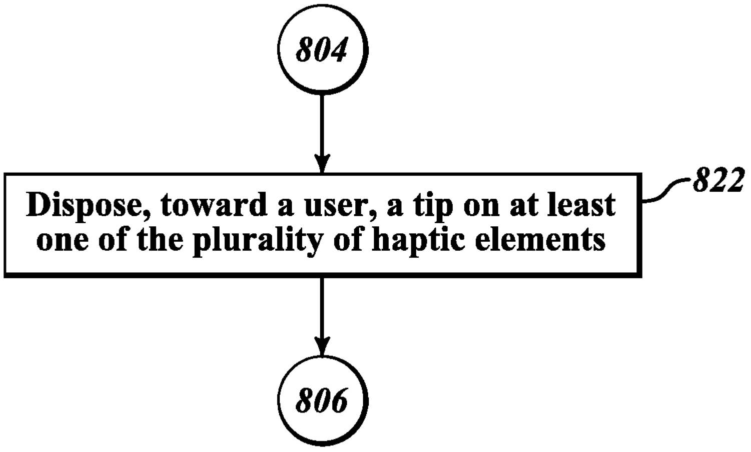

Referring now to FIG. 22G, in some embodiments a tip may be disposed toward a user on at least one of the plurality of haptic elements at a block 822.

Figure 22H:
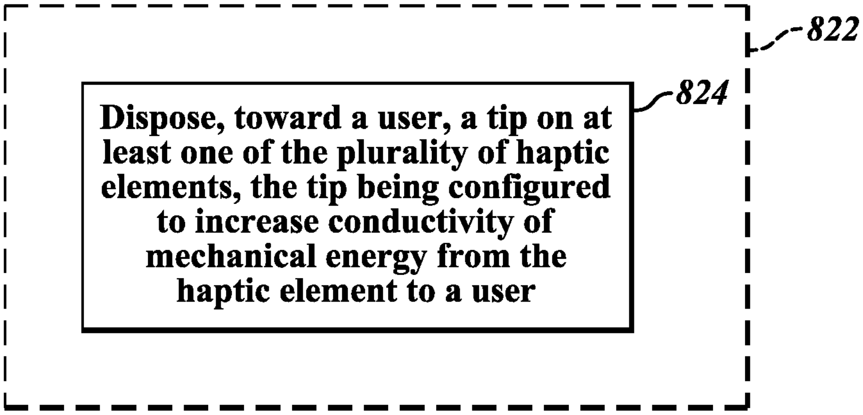

Referring now to FIG. 22H, in some embodiments disposing, toward a user, a tip on at least one of the plurality of haptic elements at the block 822 may include disposing, toward a user, a tip on at least one of the plurality of haptic elements, the tip being configured to increase conductivity of mechanical energy from the haptic element to a user at a block 824.

Figure 22I:
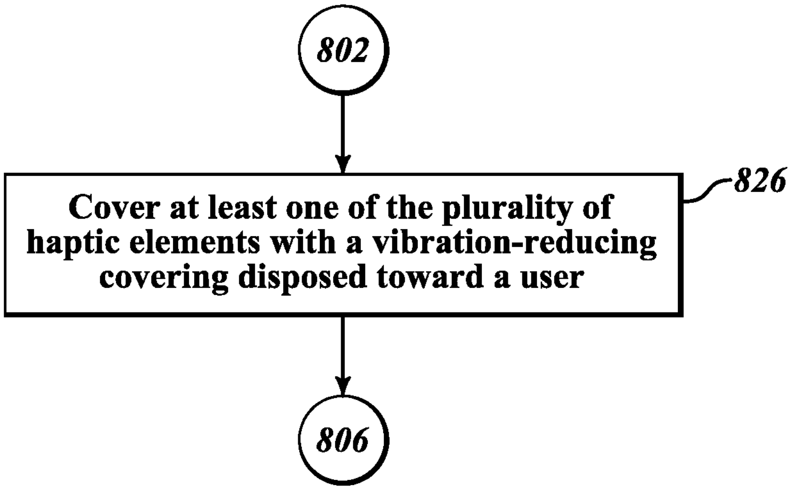

Referring now to FIG. 22I, in some embodiments at least one of the plurality of haptic elements may be covered with a vibration-reducing covering disposed toward a user at a block 826.

Figure 22J:
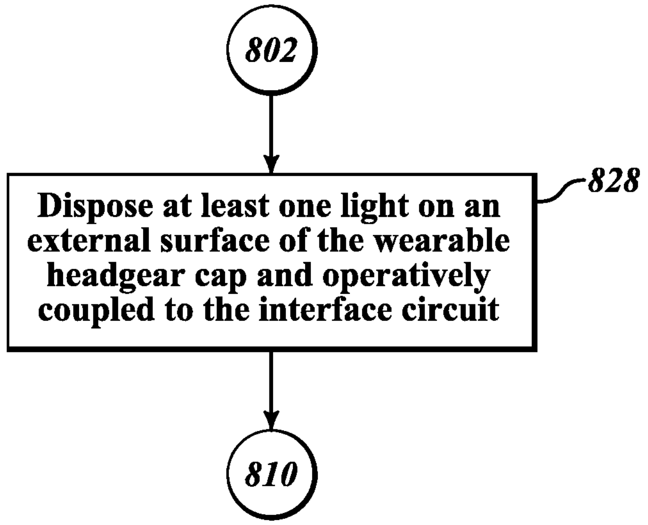

Referring now to FIG. 22J, in some embodiments at least one light may be disposed on an external surface of the wearable headgear cap and operatively coupled to the interface circuit at a block 828.

Figure 22K:
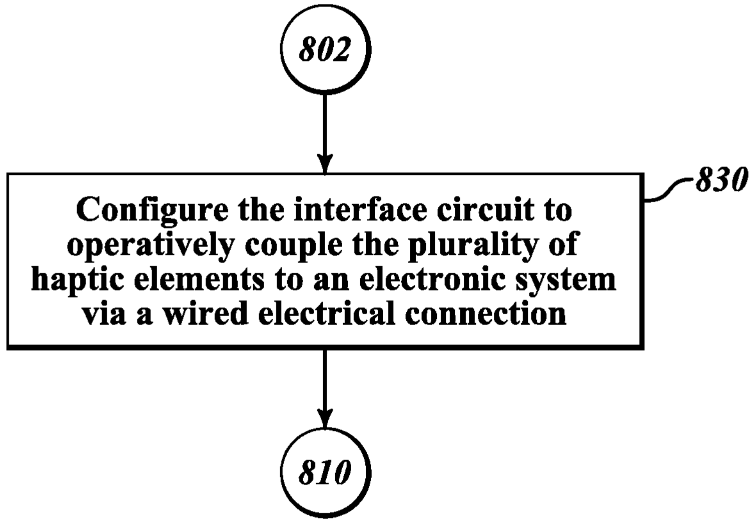

Referring now to FIG. 22K, in some embodiments the interface circuit may be configured to operatively couple the plurality of haptic elements to an electronic system via a wired electrical connection at a block 830.

Figure 22L:
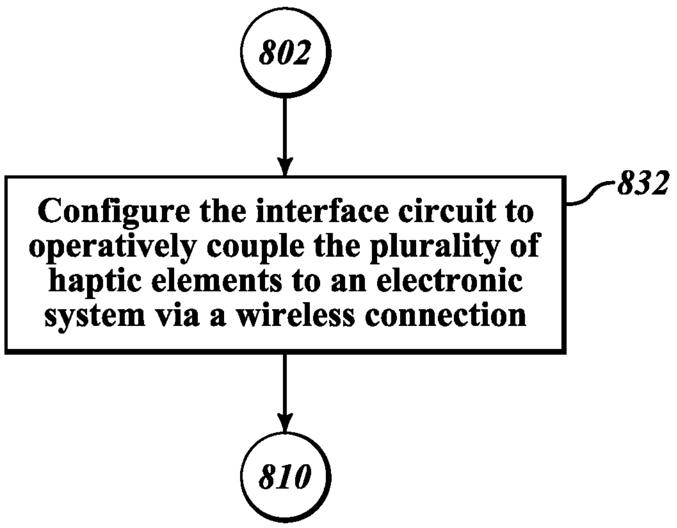

Referring now to FIG. 22L, in some embodiments the interface circuit may be configured to operatively couple the plurality of haptic elements to an electronic system via a wireless connection at a block 832.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A wearable haptic feedback device comprising:

a wearable headgear cap;

a web disposed within the cap;

a plurality of haptic elements disposed about the web and configured to provide haptic feedback to a user; and an interface circuit configured to operatively couple the plurality of haptic elements to an electronic system, wherein the interface circuit is further configured to adjust an amount of vibration of first ones of the plurality of haptic elements based upon location of the haptic element in relation to a head of the user.

2. The device of claim 1, wherein the wearable headgear cap includes a size adjustment device.

3. The device of claim 1, further comprising a placement-assist member disposed on an external surface of the wearable headgear cap.

4. The device of claim 1, wherein the web includes a vibration-reducing covering.

5. The device of claim 1, wherein at least one of the plurality of haptic elements includes a tip disposed toward the user.

6. The device of claim 1, wherein at least one of the plurality of haptic elements includes a vibration-reducing covering disposed toward the user.

7. The device of claim 1, wherein the interface circuit is further configured to increase an amount of vibration of first ones of the plurality of haptic elements based upon location of the haptic element in relation to a head of the user.

8. The device of claim 1, wherein the interface circuit is further configured to decrease an amount of vibration of first ones of the plurality of haptic elements based upon location of the haptic element in relation to a head of the user.

9. The device of claim 1, further comprising at least one light disposed on an external surface of the wearable headgear cap and operatively coupled to the interface circuit.

10. A wearable haptic feedback device comprising:

a wearable headgear cap shaped to conform to a user's head, the wearable headgear cap including a size adjustment device;

a web disposed within the cap;

a plurality of haptic elements disposed about the web and configured to provide haptic feedback to a user; and an interface circuit configured to operatively couple the plurality of haptic elements to an electronic system, wherein the interface circuit is further configured to adjust an amount of vibration of first ones of the plurality of haptic elements based upon location of the haptic element in relation to a head of the user.

11. The device of claim 10, further comprising a placement-assist member disposed on an external surface of the wearable headgear cap.

12. The device of claim 10, wherein the web includes a vibration-reducing covering.

13. The device of claim 10, wherein at least one of the plurality of haptic elements includes a tip disposed toward the user.

14. The device of claim 10, wherein at least one of the plurality of haptic elements includes a vibration-reducing covering disposed toward the user.

15. The device of claim 10, wherein the interface circuit is further configured to increase an amount of vibration of first ones of the plurality of haptic elements based upon location of the haptic element in relation to a head of the user.

16. The device of claim 10, wherein the interface circuit is further configured to decrease an amount of vibration of first ones of the plurality of haptic elements based upon location of the haptic element in relation to a head of the user.

17. The device of claim 10, further comprising at least one light disposed on an external surface of the wearable headgear cap and operatively coupled to the interface circuit.

18. A wearable haptic feedback device comprising:

a wearable headgear cap shaped to conform to a user's head;

a placement-assist member disposed on an external surface of the wearable headgear cap;

a web disposed within the cap;

a plurality of haptic elements disposed about the web and configured to provide haptic feedback to a user; and an interface circuit configured to operatively couple the plurality of haptic elements to an electronic system, wherein the interface circuit is further configured to adjust an amount of vibration of first ones of the plurality of haptic elements based upon location of the haptic element in relation to a head of the user.

19. The device of claim 18, wherein the wearable headgear cap includes a size adjustment device.

20. The device of claim 18, wherein the web includes a vibration-reducing covering.

21. The device of claim 18, wherein at least one of the plurality of haptic elements includes a tip disposed toward the user.

22. The device of claim 18, wherein at least one of the plurality of haptic elements includes a vibration-reducing covering disposed toward the user.

23. The device of claim 18, wherein the interface circuit is further configured to increase an amount of vibration of first ones of the plurality of haptic elements based upon location of the haptic element in relation to a head of the user.

24. The device of claim 18, wherein the interface circuit is further configured to decrease an amount of vibration of first ones of the plurality of haptic elements based upon location of the haptic element in relation to a head of the user.

25. The device of claim 18, further comprising at least one light disposed on an external surface of the wearable headgear cap and operatively coupled to the interface circuit.

26. A wearable haptic feedback device comprising:

a wearable headgear cap shaped to conform to a user's head;

a web disposed within the cap, the web including a vibration-reducing covering;

a plurality of haptic elements disposed about the web and configured to provide haptic feedback to a user; and an interface circuit configured to operatively couple the plurality of haptic elements to an electronic system, wherein the interface circuit is further configured to adjust an amount of vibration of first ones of the plurality of haptic elements based upon location of the haptic element in relation to a head of the user.

27. The device of claim 26, wherein the wearable headgear cap includes a size adjustment device.

28. The device of claim 26, further comprising a placement-assist member disposed on an external surface of the wearable headgear cap.

29. The device of claim 26, wherein at least one of the plurality of haptic elements includes a tip disposed toward the user.

30. The device of claim 26, wherein at least one of the plurality of haptic elements includes a vibration-reducing covering disposed toward the user.

31. The device of claim 26, wherein the interface circuit is further configured to increase an amount of vibration of first ones of the plurality of haptic elements based upon location of the haptic element in relation to a head of the user.

32. The device of claim 26, wherein the interface circuit is further configured to decrease an amount of vibration of first ones of the plurality of haptic elements based upon location of the haptic element in relation to a head of the user.

33. The device of claim 26, further comprising at least one light disposed on an external surface of the wearable headgear cap and operatively coupled to the interface circuit.

* * * * *